(12) United States Patent
Labov et al.

(10) Patent No.: US 11,009,622 B2
(45) Date of Patent: May 18, 2021

(54) MULTIFACETED RADIATION DETECTION AND CLASSIFICATION SYSTEM

(71) Applicant: Lawrence Livermore National Security, LLC, Livermore, CA (US)

(72) Inventors: Simon E. Labov, Berkeley, CA (US); Karl E. Nelson, Livermore, CA (US); Brandon S. Seilhan, Emeryville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 19 days.

(21) Appl. No.: 16/417,324

(22) Filed: May 20, 2019

(65) Prior Publication Data
US 2019/0353822 A1    Nov. 21, 2019

Related U.S. Application Data

(60) Provisional application No. 62/805,825, filed on Feb. 14, 2019, provisional application No. 62/673,750, filed on May 18, 2018.

(51) Int. Cl.
*G01V 5/00*     (2006.01)
*G01T 1/167*    (2006.01)
*G01T 1/36*     (2006.01)

(52) U.S. Cl.
CPC ............ *G01V 5/0075* (2013.01); *G01T 1/167* (2013.01); *G01T 1/36* (2013.01); *G01V 5/0091* (2013.01)

(58) Field of Classification Search
CPC .... G01V 5/0075; G01V 5/0091; G01T 1/167; G01T 1/36; G01T 7/00
See application file for complete search history.

(56) References Cited

U.S. PATENT DOCUMENTS

| 8,429,153 | B2 | 4/2013 | Birdwell et al. |
| 2005/0023477 | A1* | 2/2005 | Archer ...................... G01T 7/00 250/370.11 |

(Continued)

OTHER PUBLICATIONS

Lei, Eric, "Robust Detection of Radiation Threat," IEEE nuclear science symposium and medical imaging conference, 2017.
(Continued)

*Primary Examiner* — David P Porta
*Assistant Examiner* — Meenakshi S Sahu
(74) *Attorney, Agent, or Firm* — Perkins Coie LLP

(57) ABSTRACT

A system identifying a source of radiation is provided. The system includes a radiation source detector and a radiation source identifier. The radiation source detector receives measurements of radiation; for one or more sources, generates a detection metric indicating whether that source is present in the measurements; and evaluates the detection metrics to detect whether a source is present in the measurements. When the presence of a source in the measurements is detected, the radiation source identifier for one or more sources, generates an identification metric indicating whether that source is present in the measurements; generates a null-hypothesis metric indicating whether no source is present in the measurements; evaluates the one or more identification metrics and the null-hypothesis metric to identify the source, if any, that is present in the measurements.

47 Claims, 9 Drawing Sheets

(56) References Cited

U.S. PATENT DOCUMENTS

2010/0198524 A1* 8/2010 Brown .................. G01N 21/65
702/27
2012/0069960 A1 3/2012 Kitagawa et al.

OTHER PUBLICATIONS

Trandon, Prateek, et al., "Detection of Radioactive Sources in Urban Scenes Using Bayesian Aggregation of Data from Mobile Spectrometers," Information Systems vol. 57, Apr. 2016.
Examiner's Report dated Jan. 4, 2021 in Canada Patent Application No. 3,100,589, 6 pages.

* cited by examiner

MULTIFACETED RADIATION DETECTION AND CLASSIFICATION SYSTEM

CROSS-REFERENCE TO RELATED APPLICATIONS

This patent document claims benefit of priority of U.S. Provisional Patent Applications No. 62/673,750, entitled "Radiation Detection Analysis Kit (RDAK)" and filed on May 18, 2018, and No. 62/805,825 entitled "Radiation Detection Analysis Kit (RDAK)" and filed on Feb. 14, 2019, which are both hereby incorporated by reference.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

The detection of sources of radiation is particularly important to help secure nuclear material and to ensure the safety of the general population, military personnel, first responders, and so on. Sources of radiation may be grouped into radiation source classes based on the use of the radiation. For example, a radiological dispersal device (e.g., dirty bomb) and a radiopharmaceutical (e.g., $^{99m}$Tc in a medical patient) would be in different radiation source classes. The radiation source classes of many sources of radiation (e.g., medical patients) represent approved uses because any safety risk is deemed acceptable, and the radiation source classes of other sources of radiation (e.g., dirty bombs) represent not approved uses because the safety risk is deemed unacceptable. Because some uses are approved and other are unapproved, it is rarely useful to simply detect the presence of a source of radiation. Thus, one of the goals of detection of sources of radiation is to differentiate radiation source classes that may present an unacceptable safety risk from those that do not.

To support radiation detection, a radiation detector, also referred to as a detector, (i.e., a physical device that detect photons) is used to collect counts of photons with energy within the radiation spectrum. A radiation detector is only able to identify the energy of a photon to a certain level of accuracy. As a result, the radiation detector may group counts of photon into ranges of energy. A radiation detector may collect the counts over a time period (e.g., one second) and present the counts within each energy range as a measurement of radiation (i.e., a radiation spectrum).

To detect sources of radiation over a wide area (e.g., city), a drone with a radiation detector may fly over the area in a pattern to collect measurements. Detectors can also be driven in vehicles, hand carried, or placed at strategic stationary locations. Those measurements can be provided to an analysis system to identify whether there is a source of radiation of interest which may be a source of radiation that presents an acceptable or unacceptable safety risk. Because different areas can have very different background radiations (e.g., caused by different geological formations or building materials), the measurements representing the same source of radiation in different areas can be very different. As a result, such an analysis system needs to consider the background radiation present in the area from which the measurements are collected.

The speed and accuracy at which a source of radiation is detected and classified (e.g., as an unacceptable or acceptable safety risk) is important. In addition, it is important to identify the nuclide (e.g., U or $^{137}$Cs) that is the source of radiation. However, some of the most advanced analysis systems require vast amounts of computational resources to process measurements, identify the background radiation, identify the source of radiation, and classify the radiation source class of the source of radiation. In addition, many of the currently deployed analysis systems employ detection algorithms that are not particularly accurate. Thus, such analysis systems may be impractical to use because of the needed computational resources or because of the poor accuracy. There is a strong need for algorithms that are both computationally efficient and have a high accuracy.

DETAILED DESCRIPTION

A method and system for detection and classification of sources of radiation is provided. A radiation detection and analysis ("RDA") system processes a stream or sequence of measurements of radiation (i.e., gamma-ray spectral data and neutron measurements) and analyzes the measurements in real time to detect presence of a source of radiation, identify the source of the radiation (e.g., U or $^{137}$Cs), and determine the radiation source class of the source of radiation. The RDA system provides a radiation source detector component ("radiation source detector") that employs a number of detection algorithms and can operate on a wide range of detector types with different materials and detector sizes. Each detection algorithm produces one or more detection metrics updated with each new measurement in the stream. The detection metrics optimize the signal-to-noise ratio under various conditions. The radiation source detector employs various background estimation algorithms to estimate the background radiation ("background") so that the contribution of the source of radiation to the measurement can be determined. The radiation source detector continually retrains the background estimation algorithms based on background measurements (i.e., measurements with no source detected). The RDA system also includes a radiation source identifier component ("radiation source identifier") that, when a source of radiation is detected, identifies the source of radiation (e.g., $^{137}$Cs) and its radiation source class. When a radiation source class is identified that is of interest (which may be an approved or unapproved use), the RDA system may output an alarm indicating the radiation source class.

The RDA system can be used in stationary or mobile detection applications. Not all of the algorithms provided by the RDA system are suitable for all detection applications. The RDA system provides an architecture that allows different combinations of detection algorithms and background estimation algorithms to be selected to optimize performance. Various combinations of algorithms can be used on sample measurements (actual or simulated). For each application, a combination of algorithms can be selected that is most appropriate for that application. The most appropriate combination can then be used in the RDA system to operate in real time with enhanced accuracy. Moreover, the RDA system can be used to process previously collected measurements much faster than if those measurements were processed in real time.

Figure 1:
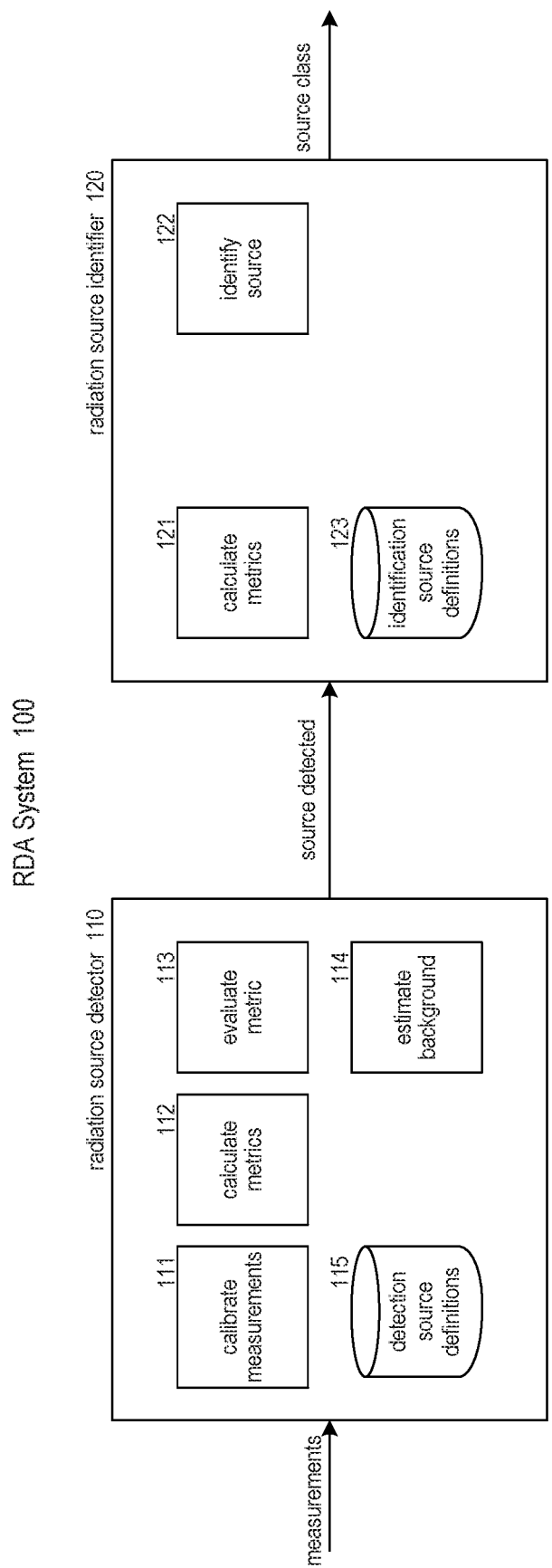
FIG. 1 is a block diagram that illustrates the overall architecture of the RDA system in some embodiments.

FIG. 1 is a block diagram that illustrates the overall architecture of the RDA system in some embodiments. The RDA system 100 includes a radiation source detector 110 and a radiation source identifier 120.

The radiation source detector inputs measurements and outputs a source detected flag for each measurement (or collection of measurements) indicating whether a source might be present in that measurement. The radiation source detector includes a calibrate measurements component 111, a calculate metrics component 112, an evaluate metric component 113, an estimate background component 114, and a detection source definitions store 115. The calibrate measurements component calibrates measurements to account for drift and nonlinearities in the sensors of a detector. The calculate metrics component calculates metrics for a measurement to indicate whether any source as defined by a source definition might be present in the measurement. A source definition for a source includes a source signature (e.g., spectral shape) for that source factoring in a specified shielding such as shield type and shield thickness. Thus, a source of radiation may be associated with a source definition for each specified shielding. A source definition can include more than one source. Some algorithms operate without a source definition detecting any anomaly different from background. The evaluate metrics component sets the source detection flag based on an evaluation of the metrics, either individually or in aggregate, to determine whether a source of radiation may be present in a measurement. The estimate background component updates an estimated background based on the measurements for which a source of radiation was not detected as being present. The calculate metrics component factors in the estimated background when calculating a metric. The detection source definitions store includes a source definition that defines source signatures of sources radiation that are to be detected.

The radiation source identifier identifies the source type and its radiation source class when the radiation source detector detects that a source is present. The radiation source identifier 120 includes a calculate metrics component 121, an identify source component 122, and an identification source definitions store 123. The calculate metrics component calculates metrics in a manner similar to that of the calculate metrics component of the radiation source detector but may use an algorithm that is particularly effective at identifying sources. The identify source component identifies the source based on evaluation of the metrics. The identify source component may output a probability for each radiation source class. The identification source definitions store includes source definitions for sources to be identified. The identification source definitions store includes a more comprehensive set of source definitions than those of the detection source definitions store to improve the accuracy of the source identification.

The RDA system inputs spectral measurements that are represented as a spectral histogram representing a detection energy range (or spectrum) with a fixed number of energy bins that each represents an energy range within the detection energy range. For example, if the energy range is 100 keV to 1 MeV, then the histogram may have 50 energy bins that each represents an energy range of 20 keV. The first energy bin would have an energy range from 100 keV to 120 keV, the second energy bin would have an energy range from 120 keV to 140 keV, . . . , and 980 keV to 1 MeV. The histogram has energy edges of 100 keV, 120 keV, 140 keV, . . . , and 1 MeV. Thus, there is one more energy edge than the number of energy bins. For a measurement interval (e.g., one second), each energy bin contains the count of photons detected that was within the energy range of that energy bin.

The table below provides a description of terminology used to describe the RDA system.

| Terms | |
|---|---|
| Term | Definition |
| Source ($N_i$) | An emitter of photons (e.g., $^{137}$Cs) |
| Detector | A device that collects photons and records counts and energy levels of the photons. |
| Energy range | Energies between a minimum and maximum energy. |
| Measurement range | Measurement range of a measurement. |
| Bin range | A subdivision of the measurement range also referred to as a bin. |
| Measurement ($X_t$) | A histogram containing for photon count for each bin in the measurement range for one measurement interval (t); also referred to as a spectrum. |
| Source definition ($SD_i$) | A combination of a source signature for a source, shielding, and an identification of the source. |
| Source signature ($S_i$) | A histogram representing a source of interest with a shielding. |
| Shielding | Specification of the shielding (e.g., type and thickness) between a source and detector (e.g., no shielding, 0.5 cm of lead, and 1.0 cm of concrete) |
| Detection algorithm | An algorithm that generates a metric indicating whether a measurement represents the presence of a source other than background. |
| Window | A collection of one or more sequential measurements, which may also be referred to as a time window or energy window. |

Figure 2:
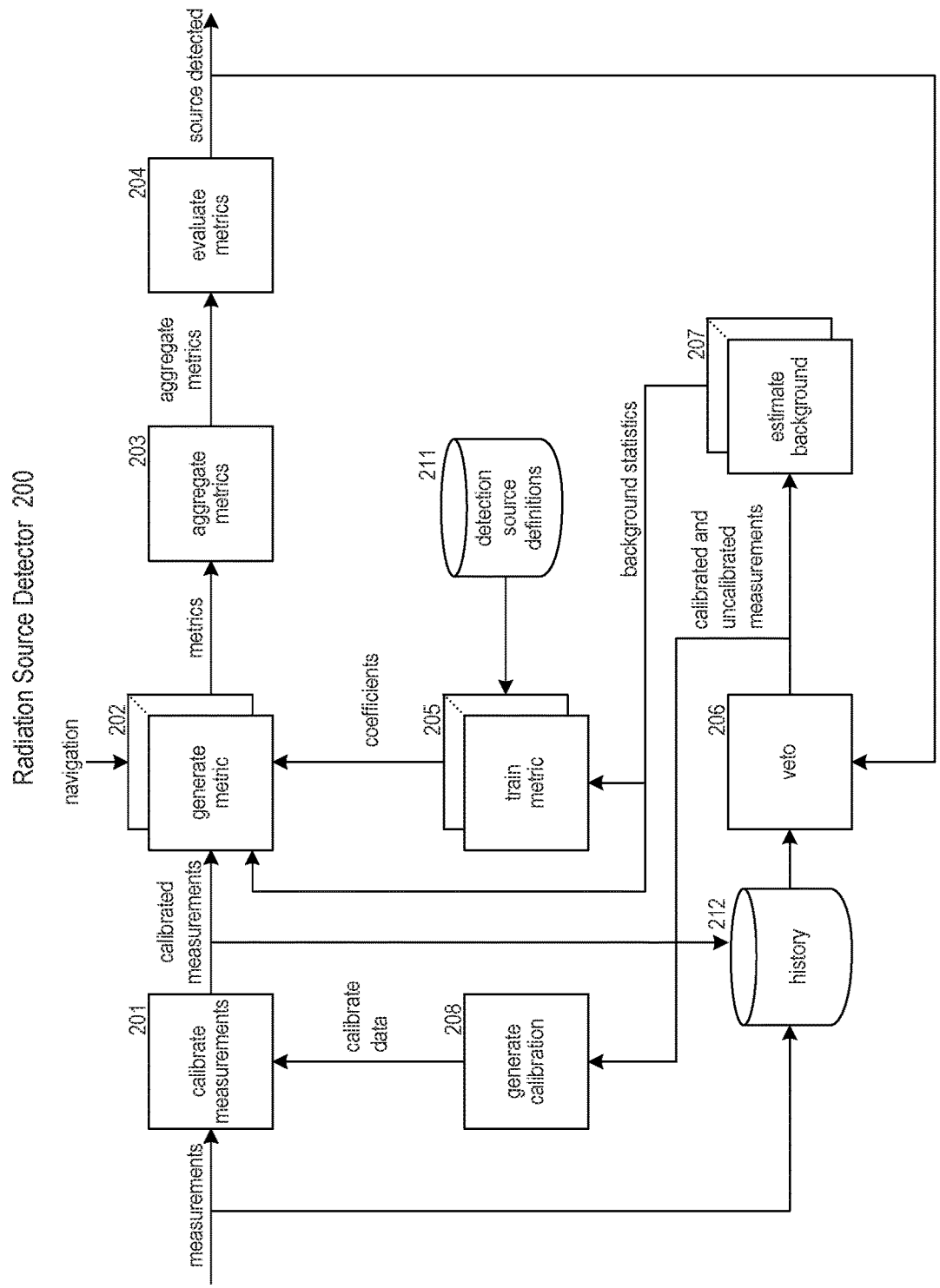
FIG. 2 is a block diagram that illustrates components of the radiation source detector of the RDA system in some embodiments.

FIG. 2 is a block diagram that illustrates components of the radiation source detector of the RDA system in some embodiments in more detail than 110 in FIG. 1. The radiation source detector 200 inputs measurements, detects whether a source may be present in a measurement, and outputs a source detected flag. The radiation source detector, however, does not perform the more computationally expensive process of actually identifying the source. The radiation source detector includes a calibrate measurement component 201, generate metric components 202, an aggregate metrics component 203, an evaluate metrics component 204, train metric components 205, a veto component 206, estimate background components 207, and a generate calibration component 208. The radiation source detector also includes a detection source definitions store 211 and a history store 212. Each component may also include a store for storing data locally that is generated by the component or received from other components.

The calibrate measurements component generates calibrated measurements to account for drift and nonlinearities in the measurements of a detector using a rebinning process. The calibrate measurements component inputs measurements and calibration data and outputs calibrated measurements. The calibration data indicates how to rebin the measurements based on the drift of the detector.

The generate metric components may include generate metric components for various types of detection algorithms. A generate metric component inputs a calibrated measurement, optionally navigation information (e.g., GPS information to identify the presence of a building), and sets of coefficients for source signatures and generates a metric for each source signature indicating whether the measurement (i.e., calibrated) represents the presence of the source of that source signature, or the presence of any source that is not background. Each set of coefficients is associated with a combination of a source signature and a detection algorithm. For example, a first set of coefficients may be the source signature for $^{137}$Cs without shielding and an orthonormal subspace projection ("OSP") matched filter (described below), a second set of coefficients may be for the source signature for $^{137}$Cs with shielding of 10 cm of lead and the OSP matched filter, and a third set of coefficients may be for the source signature for U without shielding and an likelihood ratio test ("LRT") matched filter (described below). For each set of coefficients, the generate metric component for the associated detection algorithm uses the coefficients to generate a metric as semi-definitive indication that the source represented by a source signature is present. The radiation source identifier provides a more definitive indication for each source. Continuing with the example, the detection algorithm for a matched filter applies the set of coefficients for the source signature of $^{137}$Cs without shielding to generate a first metric and applies the set of coefficients for the source signature of $^{137}$Cs with shielding of 10 cm of lead to generate a second metric. Each metric may be represented as a numerator and a denominator pair, referred to as metric partials. For example, the metrics for the source signature of $^{137}$Cs without shielding for a certain detection algorithm may be (1,5). Although the detection algorithms are primarily described as being matched filters, the detection algorithms may also be anomaly detectors. An anomaly detector generates a metric indicating whether the deviation of a measurement from the estimated background may be sufficient to indicate that a source might be present irrespective of what the source might be.

The aggregate metrics component generates an aggregated metric for each combination of a source signature, a detection algorithm, and a window of measurements (e.g., rolling window). Each window includes a number of the most recent measurements such as 1, 2, and 4. For example, the metric partials for the source signature of $^{137}$Cs without shielding and the certain detection algorithm for four sequential measurements may be (1,4), (3,5), (1,2), and (3,5). To aggregate the metrics for a window for a source signature, the aggregate metrics component may sum the numerators and sum the denominators of the metric partials and set the aggregated metric to the sum of the numerators divided by the square root of the sum of the denominators. Continuing with the example, the individual metric partials (1,5) would provide for the time window of 1: the metric of 1 divided by the square root of 4, which is 0.5. The first two metric partials would be aggregated for the time window of 2: the sum of the numerators is 4, the sum of the denominators is 9, and 4 divided by the square root of 9 is 1.33. All four metric partials would be aggregated for the time window of 4: the sum of numerators is 8, the sum of the denominators is 16, and 8 divided by the square root of 16 gives an aggregated metric of 2. So, the aggregated metrics are 0.5, 1.33, and 2 for $^{137}$Cs without shielding and the certain detection algorithm for windows with one, two, and four measurements. Aggregation can also occur based on measurements taken in the same location even if at different times.

The evaluate metrics component inputs the aggregated metrics and outputs a single decision metric indicating whether a source was detected. The evaluate metrics component first normalizes each aggregated metric by subtracting the measured mean and dividing by the measured standard deviation. The decision metric is then determined from an evaluation of all the normalized aggregated metrics including different time windows, different algorithms, and different sources. This evaluation typically uses the maximum of each normalized aggregated metric; weighting factors can also be used either determined based on performance analysis of different methods, or using machine learning as detailed below.

The evaluate metrics component then compares the decision metric to a number of thresholds that are established to control the operation of the radiation source detector. One such threshold is the source present threshold. The evaluate metrics component sets a source detected flag (i.e., true or false) when the decision metric exceeds a source present threshold. The source detected flag will then trigger the radiation source identifier. The source present threshold may be set so that a failure of detecting a source when no source is present (false positive or false alarm) is likely to occur at a certain rate such as one false alarm occurs per 8 hours. The certain rate may be based on the period (e.g., 8 hours), the measurement rate, the number of rolling windows, and number of metrics. As another alternative, the evaluate metrics component may calculate the decision metric using a classifier generated via machine learning algorithm (e.g., support vector machine, Bayesian classifier, and neural network). The classifier may be trained using training data that includes feature vectors and labels. The features of the feature vectors may include a detection algorithm, a source, a window size, and an aggregated metric. The feature vectors may be generated based on data collected and generated while performing actual detection involving different sources. The feature vector may also be generated using mathematical models to generate simulated measurements for different types of sources such as $^{137}$Cs with a shielding of 10 cm of iron, different angular velocities between a source and a detector (e.g., identified based on GPS readings), and so on. The labels may be an indication of whether a feature vector represents the presence (e.g., true or false) or a probability of the presence of the source. The labels may be manually generated or generated based on data generated when the radiation source identifier identifies a radiation source and a radiation source class.

The evaluate metrics component also compares the decision metric to an extended aggregation threshold. When this threshold is exceeded, the radiation source identifier is triggered to aggregate until the decision metric falls below the end aggregation threshold. The decision metric may also be compared with a veto threshold, typically set very low. When the decision metric exceeds the veto threshold, a lockout flag is sent to the veto component 206 that controls whether or not a measurement will be used for calibration or background estimation.

The estimate background components may include an estimate background component for each background algorithm. An estimate background component inputs measurements and generates background statistics for an estimate of the background. Each background algorithm may generate a different statistic such as average counts in a measurement representing background (referred to as rate), an average measurement for the background, or a basis for the background. The detection algorithms may employ different background statistics. For example, one detection algorithm may employ a rate statistic, and another detection algorithm may employ rate and basis statistics. The estimate background components may generate statistics that are a weighted sum of a new statistic and the previous statistic. For example, if the new rate is 160 and the previous rate was 200 and the weight is 0.25, then the weighted rate to be used as the current rate would be 190 (i.e., 200*0.75+160*0.25). The weight thus controls how quickly the estimates adjust based on new statistics. The estimate background components may generate the background statistics periodically (e.g., every 5 minutes) or based on an analysis that the current background is significantly different from the previous background.

The veto component provides uncalibrated measurements to the generate calibrate measurement component and calibrated measurements to the estimate background components. The veto component, however, filters out those measurements that should not be used in an estimate of the background. For example, each measurement that was used in generating an aggregated metric that is above a veto threshold may be filtered out. The measurements before and after those measurements may have a contribution of the source. To remove this contribution from the background, the veto component may filter out measurements that are within an expanded window (fixed or variable) before and after the measurements used to generate the aggregated metric. Thus, the use of an expanded window allows for measurements to be filtered out that may be affected by the source but not included in the aggregated metric. If not filtered out, those measurements would be factored into the calculation of the background, resulting in an estimated background that would tend to become less sensitive to the source. The veto threshold may be set so that a missed veto is likely to occur at a certain rate such as one missed veto every 10 minutes. The certain rate may be based on the period (e.g., 10 minutes) and the measurement rate.

The train metrics components inputs source signatures and background statistics and generates sets of coefficients for combinations of source signatures and detection algorithms. A set of coefficients, however, may not be generated for each combination. For example, one detection algorithm may be particularly effective for identifying $^{137}$Cs but not effective for identifying U. In such a case, that detection algorithm may generate a set of coefficients for $^{137}$Cs, but not for U.

The history store contains each measurement and calibrated measurement. The detection source definitions store contains source definitions (e.g., one for each shielding) for each of each source whose presence is to be detected.

Figure 3:
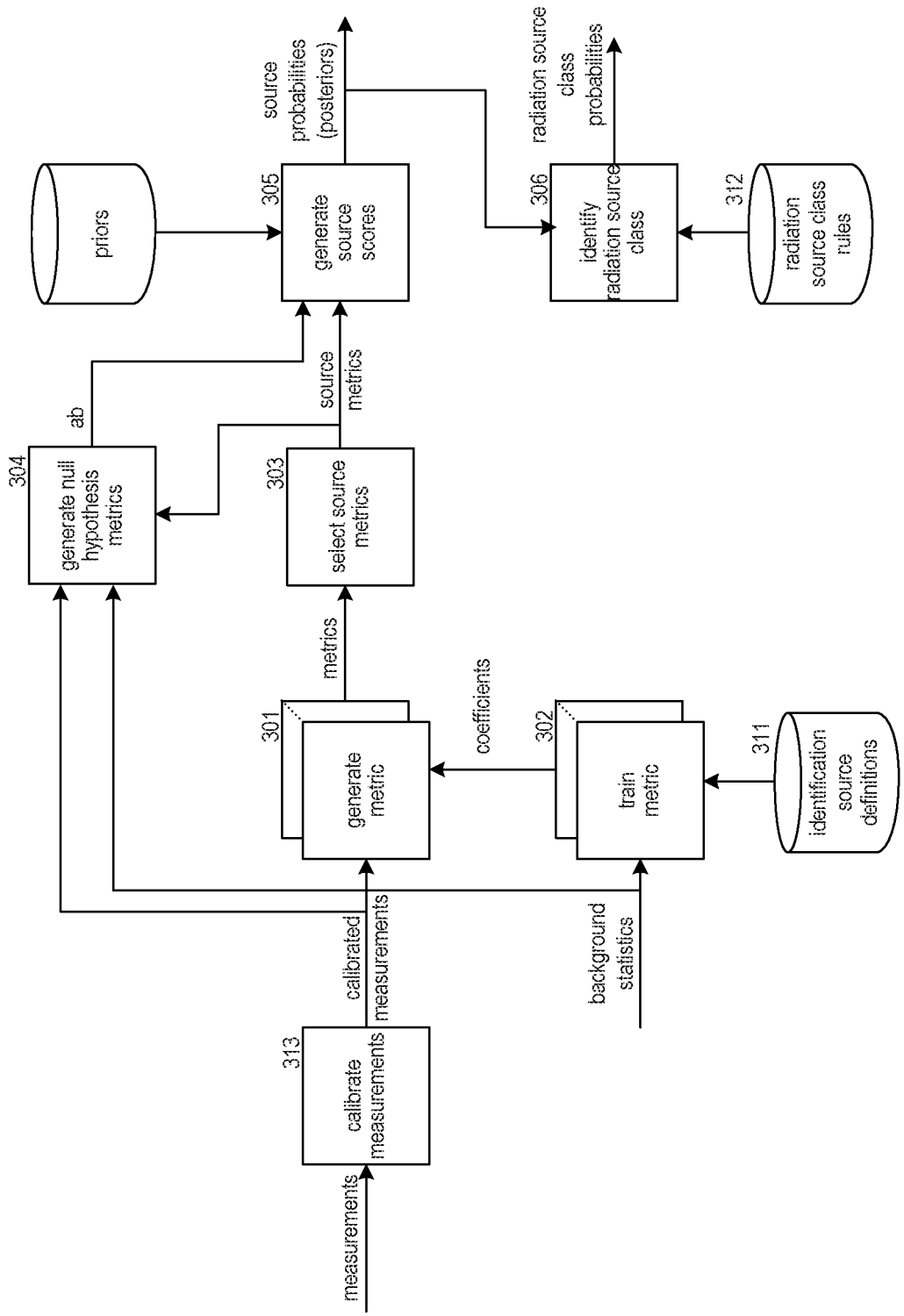
FIG. 3 is a block diagram that illustrates components of the radiation source identifier of the RDA system in some embodiments.

FIG. 3 is a block diagram that illustrates components of the radiation source identifier of the RDA system in some embodiments. When the radiation source detector detects that a source may be present, the radiation source identifier executes and identifies the source (e.g., $^{137}$Cs) and the radiation source class that is the predominant contributor to the non-background photons measured. The radiation source identifier inputs the measurements and background statistics used by the radiation source detector to detect that a source is present. The measurements may be a summation of the measurements included in each window. For example, if the window includes 512 measurements, the radiation source identifier adds those measurements together to give a single summed measurement. The radiation source identifier outputs an indication of the source that is present. The radiation source identifier may output for each source a probability that that source is present. For example, the radiation source identifier may output a probability of 0.67 for $^{137}$Cs and a probability of 0.11 of U. The radiation source identifier also applies radiation source class rules to identify the radiation source class of the source. For example, the radiation source class of the source may be medical, industrial, fissile, and so on. The radiation source classes may also be represented by probabilities. The radiation source identifier may include a calibrate measurements component 313, generate metric components 301, train metric components 302, a select source metrics component 303, a generate null-hypothesis metric component 304, a generate source scores component 305, and an identify radiation source class component 306. The radiation source identifier also includes an identification source definitions store 311 and a radiation source class rules store 312.

The calibrate metrics component of the source classifier inputs measurements used by the radiation source detector when a source is detected. The calibrate metrics component aligns the bin ranges of the measurements and the source signatures. The calibrate metric component may shift either the bin ranges of the measurements or the bin ranges of the source signatures. The shifting of the bin ranges of the measurements induces correlations between the bins that need to be tracked to ensure statistical accuracy. The shifting of the source definitions is more statistically accurate but takes more computational resources because each source signature needs to be shifted.

The identification source definitions store is similar to, but has a more comprehensive set of source definitions than, the detection source definitions store. The set is more comprehensive to account for the detection efficiency of a source definition. The detection efficiency refers to the likelihood that the source signature will be effective in detecting the source irrespective of the shielding. For example, a source signature for a source with a shielding of 5 cm of lead may have a detection efficiency of 0.25 and with a shielding of 7 cm of lead may have a detection efficiency of 0.15. The goal is to have source signatures for enough shielding configurations to minimize the shielding configurations for which the detection efficiency is less the maximum possible detection efficiency. To maximize the overall performance, a tradeoff is required between detection efficiency across all shielding configurations on interest, and false alarm opportunities which will increase with the number of signatures in use.

In some embodiments, it is useful to capture signatures observed in the field. Using a form of semi-supervised learning, significant detections with spectra that have similarity to a source signature, but is not as close a match as expected, can be extracted from the measurement to create a new source signature that can be added to the source signature store. To determine if a measured spectrum is adequately represented by the source signatures in the source signature store, the detection efficiency with the extracted spectrum is compared with the detection efficiency of the existing source signatures in the source signature store. This method can increase sensitivity to sources being tested that are in between shielding configurations used in the source signature store, unexpected mixtures of sources, or have some differences from the source signatures in the source signature store. This new source signature can be added to the source signature store locally for the detector in use, and when desired also distributed to source signature stores in use by other detectors of the same type.

Figure 4:
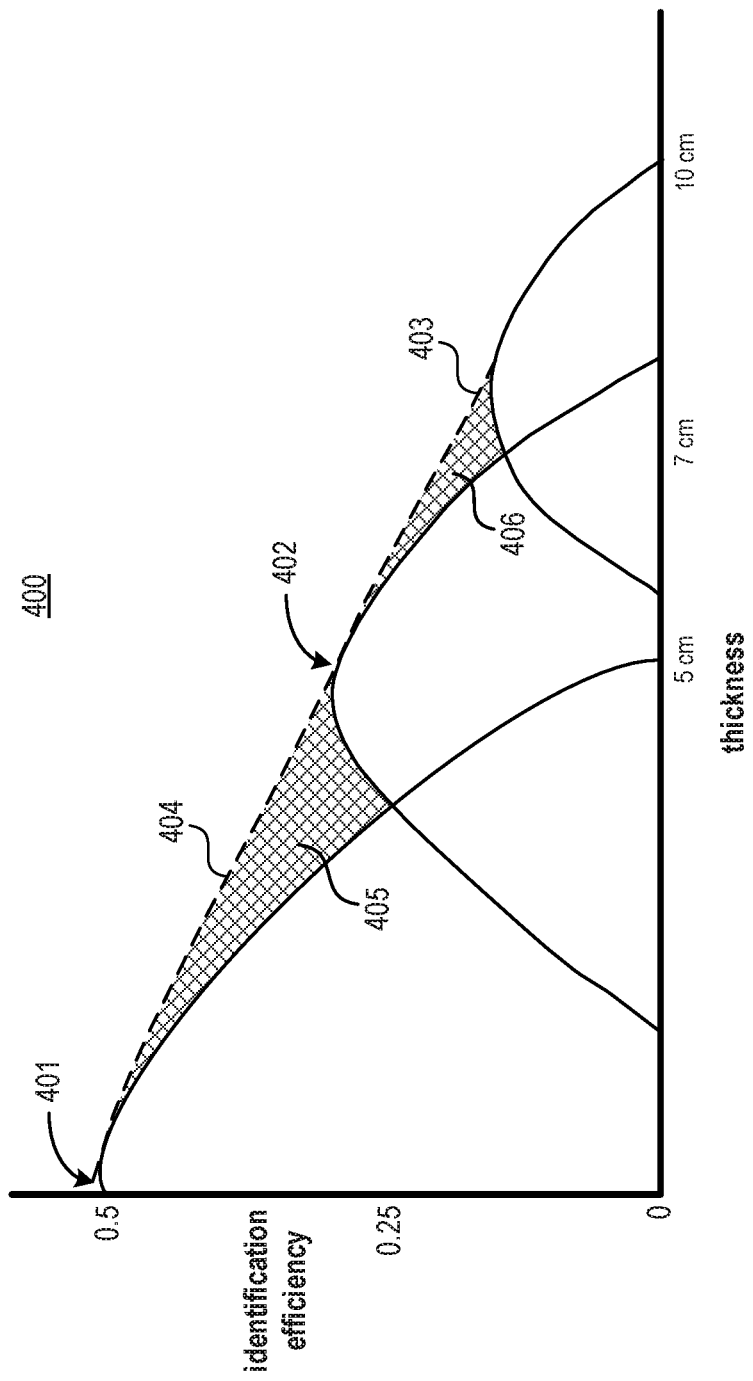
FIG. 4 is a graph that illustrates detection efficiencies.

For identification, the source is assumed to already have been detected, and the false alarm rate is no longer a factor. So, for identification, the limit to the number of source signatures is less severe, restricted only by computational costs. FIG. 4 is a graph that illustrates source identification efficiencies. The graph 400 includes an x-axis representing thickness and a y-axis representing detection efficiency. The solid line 401 represents the identification efficiency of a source signature without shielding. The identification efficiency has a maximum of 0.5 with a thickness of 0 cm and declines to 0.0 with a thickness of 5 cm, which means that the source shielded by 5 cm will not be identified with the source signature without shielding. Solid lines 402 and 403 show the identification efficiencies for source signatures of 5 cm and 7 cm, respectively. The dashed line 404 connects the detection efficiencies for those thicknesses with a source signature. The areas 405 and 406 represents gaps between the maximum identification efficiencies and the actual identification efficiencies. Such gaps may result in a source being misidentified. The areas of the gaps may be reduced by adding source definition for more shielding thicknesses. For example, the gap 405 will be reduced by adding a source definition with a thickness of 3 cm.

The generate metric components includes a generate metric component for each identification algorithm that is used by the radiation source identifier. In some embodiments, only one identification algorithm is used such as one similar to the OSP matched filter but differs in the normalization term to account for the differences between detection efficiency and identification efficiency. The train metric components may be similar to the metric trainer component of the radiation source detector.

The select source metrics component inputs the metrics, identifies the metric that is best for each source, and outputs those metrics as source metrics. For example, the metrics for $^{137}Cs$ without shielding and with shieldings of 1 cm and 2 cm may be 1.0, 2.0, and 0.5, respectively. In such a case, the select source metrics component would select 2.0 as the source metric for $^{137}Cs$.

The generate null-hypothesis metrics component inputs the measurements, background statistics, and the source metrics and generates null-hypothesis metrics representing a statistically worst-case scenario for the background. The generate null-hypothesis metrics component calculates the variance of each channel of a measurement and of the expected background. The generate null-hypothesis metrics component also calculates the variance of each metric and the covariances of the source metrics. The generate null-hypothesis metrics component calculates a score for the null-hypothesis based on the variances and the covariances of the source metrics and outputs the variance of the null hypothesis (e.g., average of the variances of the metrics) and the score for the null hypothesis The generate source scores component inputs target metrics (i.e., source metrics and the null-hypothesis metrics) and initial probabilities (priors) for each target (i.e., a source and the background). The generate scores component calculates a probability for each target given the measurement as the maximum of the probabilities that the metric for a target is greater than the target metric of each other target. The maximum probability may be based on a multivariate normal distribution centered at the measurement given the measurement and the variance of each target metric. The generate source scores component generates a target probability (posteriors) for each target, for example, using a Bayesian estimator to generate the target probabilities.

The identify radiation source class component inputs target probabilities and applies radiation source class rules to generate radiation source class probabilities for each radiation source class. The radiation source class rules store contains the radiation source class rules. Alternatively, the identify radiation source class component may select, for each radiation source class, the maximum radiation source class probability of a target being that radiation source class. Like the target probabilities, the maximum radiation source class probabilities may be based on multivariate normal distribution and the variance for that radiation source class.

Detection Algorithms

The RDA system supports use of various combinations of detection algorithms, metric trainers, and aggregation techniques. By supporting such combinations, the RDA system can be used in a wide-range of applications and can be tailored to those applications.

The RDA system may be used with both projection-based and quadratic-based detection algorithms. A projection-based detection algorithm can be decomposed into a set of linear operations that each operates on a measurement independently. For example, a detection algorithm may generate a metric by calculating a numerator and a denominator by applying a linear transform to the sum of the measurements over a period of time as represented by the following equation:

$$DM = \frac{T_N(X_1 + X_2 + \ldots + X_k)}{\sqrt{T_D(X_1 + X_2 + \ldots + X_k)}}$$

wherein DM represents the metric, $T_N$ and $T_D$ represent linear transformation matrices, and $X_i$ represents the measurement at time i. Because the numerator and denominator are linear operations, the linear transform can be distributed as represented by the following equation:

$$DM = \frac{(T_N X_1 + T_N X_2 + \ldots + T_N X_k)}{\sqrt{(T_D X_1 + T_D X_2 + \ldots + T_D X_k)}}$$

Thus, the metric can be independently calculated for each measurement to generate a numerator and denominator pair represented by the following equation:

$$U_i = (T_N X_i, T_D X_i).$$

which can be aggregated together. The metric can be incrementally updated as each measurement is received as represented by the following equation:

$$DM_k = \frac{N_{DM_{k-1}} - T_{N_{k-n}} X_{k-n} + T_{N_k} X_k}{\sqrt{D_{DM_{k-1+}} - T_{D_{k-n}} X_{k-n} + T_{D_k} X_k}}$$

where n represents the number of measurements used to calculate the decision metric. Because the projection needs only to be made on a new measurement, the projection-based detection algorithms are not computationally expensive.

With a quadratic-based detection algorithm, the numerator or the denominator are generated as the product of the measurements through a transformation matrix as represented by the following equation:

$$DM = \frac{(X_1 + X_2 + \ldots + X_k)^t A(X_1 + X_2 + \ldots + X_k)}{\sqrt{T_D(X_1 + X_2 + \ldots + X_k)}}$$

With a quadratic-based detection algorithm, it is not possible to separate the interactions the first measurement with the last measurement in a window as represented by the following equation:

$$(X_1 + X_2 + \ldots + X_k)^t A(X_1 + X_2 + \ldots + X_k) = \sum_{i=1}^{k}\sum_{j=1}^{k} X_i T X_j \neq \sum_{j=1}^{k} X_i T X_i$$

As a result, quadratic-based detection algorithms are more computationally expensive than projection-based detection algorithms. The majority of anomaly detection algorithm are quadratic-based.

Orthonormal Subspace Projection ("OSP") Matched Filter

A metric trainer for an OSP matched filter constructs an optimal multiplicative spectral filter that best eliminates the background. The metric trainer uses an estimated background basis function B that is an orthonormal subspace projection. This projection is maximum towards a source signature S with a weighting matrix W based on the estimated background. The metric generated by the OSP matched filter has a Gaussian distribution and can be normalized to have zero mean and unit variance. A metric for an OSP matched filter may be represented by the following equation:

$$DM(X) = \frac{S^t W(I - B(B^t W B)^{-1} B^t W)X}{k\sqrt{|X|_1}} = \frac{TX}{\sqrt{|X|_1}}$$

The metric trainer for an OSP matched filter computes the optimum projection vector T or coefficients (referred to as a transform) for an estimated background, source signature, and basis function. (The symbol t as a superscript represents transpose.) A matched filter is defined by an individual source signature.

The metric trainer inputs a source signature $S_i$, an estimated background $\overline{B}$, and a background basis vector. The estimated background may be computed using an exponential smoothing function. The weighting matrix may be computed by partitioning the previous background measurements B. The metric trainer may calculate the optimum projection vector T as follows:
1) Compute the inverse of the diagonal of the weighting matrix W from the estimated background $\overline{B}$ where each energy bin variance is the one over the square root of the expected background plus a scalar
2) Compute the weighted background: $B_W = (B^t W B)^{-1} B^t W$
3) Weight the source signature by weighting matrix $S^t W$
4) Compute the source signature weighted projection: $S^t W B$
5) Compute the background weighted projection: $S^t W B (B_W)$
6) Set the optimum projection vector T to the difference between the source signature and background weighted projections.
7) Set a variance scalar V to the sum of the squares of the optimum projection vector T times the estimated background: $V = \Sigma_i t_i^2 \overline{b}_i$.
8) Divide the terms of the optimum projection vector T by the square root of the expected variance so that the expected variance is one: $T/\sqrt{|X|_1}$.

The performance characteristics of an OSP matched filter may be modeled with the following equation:

$$U = \frac{\epsilon S_{Mc}}{\sqrt{S_{Mc} + S_{Mc}}}$$

where U is the performance characteristic, $\epsilon$ is the detection efficiency associated with a source signature, $S_{Mc}$ is the total number of counts from the source in a measurement, and $S_{Mc}$ is the total number of background counts in the measurement.

Hybrid Matched Filter

A hybrid matched filter combines both the properties of matched filters and the properties of gross count type algorithms. The combination may allow for more effective detection when the systematic noise and the statistical noise are similar to each other for the timescale of the maximum integration. Such similarity between systematic noise and statistical noise is often found in small detectors (e.g., pagers).

A hybrid matched filter does not remove all of the shapes associated with the background, but instead removes the portions that do not correspond to the source signature. As a portion of the background is being retained, a hybrid matched filter estimates and removes the bias. The metric trainer for a hybrid matched filter generates a transform T as represented by the following equations:

$$\hat{B} = (I - \mu S(S^t S)^{-1} S)$$

$$T = k S^t W(I - \hat{B}(\hat{B}^t W \hat{B})^{-1} \hat{B}^t W)$$

where $\overline{B}$ is the average background per recent unit time, $\hat{B}$ is the background without the source, and k and μ are variables adapted to produce a metric with a unit variance and a normal distribution for the maximum aggregation time specified. A metric for a hybrid match filter may be calculated as represented by the following equation:

$$\mu = T\overline{B}$$

$$DM = \frac{TX - \mu \Delta t}{\sqrt{|\overline{B}\Delta t|_1}}$$

where $\Delta t$ represents change in time period. A hybrid matched filter may not be well-suited for long time aggregations as the systematic variability removal is limited.

The performance characteristics of a matched filter may be modeled with the following equation:

$$D = \frac{\epsilon S_{Mc}}{\sqrt{B_{Mc}}} + \sigma^2$$

where D is the performance characteristic, $\epsilon$ is the detection efficiency for the source signature, $S_{Mc}$ is the number of source counts in a measurement, $B_{Mc}$ is the number of background counts in a measurement, and $\sigma^2$ is a position variable drift term that depends on how well the current background matches the previous background used to estimate. A hybrid matched filter may perform better than a standard gross count metric when properly tuned because the position dependent drift is generally smaller than that of the gross count metric.

Bi-Dimensional ("BD") Matched Filter

A BD matched filter helps address a problem that occurs when a background rate is used by a detection algorithm. When the background rate increases suddenly, a detection algorithm may underestimate the background. As a result, the mean of the metric will increase because this underestimated background is subtracted from the measurement. Also, the variance of the metric will increase because more Poisson noise is present when the background increases. Thus, measurements with increased background are likely to result in a metric that is above the threshold resulting in a false positive.

A BD matched filter, like a hybrid matched filter, allows the intensity (i.e., number of counts) of the measurement over the background to contribute to the metric along with the change in measurement shape. A BD matched filter introduces nonlinear elements to limit the effects of this contribution. A BD matched filter balances these nonlinear elements so that an increase in the background will decrease the metric resulting in the chance of a false positive being constant regardless of the conditions.

A BD matched filter algorithm does not use an oblique OSP. Rather, a BD matched filter algorithm computes the total counts in a source signature and each of the background basis vectors that represent the background. The decomposition will use both the measurement and the expected background measurement. A BD matched filter is bi-dimensional in the sense that it produces both an estimated source and an estimated background for a measurement.

Because the estimated background of a measurement is based both on the measurement and the estimated background, the estimated background will be less than the actual background. Thus, the BD match filter algorithm calculates a penalty by applying a penalty function based on the difference between the estimated and expected background. The penalty tends to balance the increase in mean and variance in the metric. If, however, the estimated background is less than the expected background, the metric is less likely to result in a false positive and thus no penalty is required. If a linear penalty function is used, the noise in the estimated background will be amplified whenever the estimated background is low. A nonlinear penalty function allows a constant false positive rate with an estimated background. Further, unlike the OSP matched filter, the estimated variance is calculated using the expected background. Thus, the metric grows as $$\frac{S}{\sqrt{B}}$$

rather than $$\frac{S}{\sqrt{S+B}}.$$

As a result, a BD matched filter has a greater detection per unit count and thus improved sensitivity.

The BD match filter can be based on the partitioned matrix problem as represented by the following equation.

$$\begin{bmatrix} S & B \\ 0 & \lambda \overline{1} \end{bmatrix} \begin{bmatrix} s \\ \overline{b} \end{bmatrix} = \begin{bmatrix} X \\ \lambda e_b \end{bmatrix}$$

where S represents the source signature, $\overline{1}$ represents a row vector of ones equal to the number of background components, s represents the estimated counts in the source, $\overline{b}$ represents a vector of background intensities in each component, B is a matrix of background basis vectors, X is measurement, $e_b$ is the estimated total count in the background, and $\lambda$ is a tuning parameter based on reliability of the estimated background total counts.

This partitioned matrix problem can be computationally expensive to solve directly because the vector projection of each of the source and background components would need to be calculated for each timestep. The partitioned matrix problem can be solved by decomposing it into a problem with the solution represented by the following equation:

$$\begin{bmatrix} s \\ b \end{bmatrix} = X + e_b$$

Because it is not necessary to solve for the individual background components, the BD matched filter estimates only a single total background term. As a result, the BD matched filter can use the same general framework used by other matched filters.

After the estimated source count and the estimate background count are generated, a metric for the DB matched filter may be calculated as represented by the following equation:

$$DM = \frac{c - \kappa \max(b_t - e_b, 0)}{\sqrt{e_b}}$$

Like the other matched filter algorithms, the numerator and denominator terms can be summed to integrate over multiple time segments. The penalty may be computed such that total integrated distribution is constant for different conditions of background intensity and background estimate terms. As the distribution function is not linear nor fixed as a function of threshold, a slope may be selected such that the distribution integrate is never greater than expected. The slight over penalty that it produces may reduce our overall sensitivity, but this sensitivity loss may not be much less than the sensitivity gained from the use of an estimated background term in the denominator term.

Likelihood Ratio Test ("LRT") Matched Filter

An LRT matched filter may employ the same metric evaluator as a hybrid matched filter. The LRT matched filter uses Poisson probability statistics for measurements to detect a source signature when the background shape is known. The LRT matched filter removes only one source signature at a time. An LRT matched filter has excellent sensitivity in static detection scenarios and may be suited for small detectors for which the statistical noise is a primary factor. The LRT matched filter may not be suited for large mobile detectors.

The LRT matched filter constructs two hypotheses as represented by the following equations.

$$H_0 = B_s B_r \Delta t$$

$$H_1 = B_s B_r \Delta t + S_s k \sqrt{B_r \Delta t}$$

where $H_0$ and $H_1$ are the hypotheses, $B_s$ represents a background shape, $S_s$ represents a source signature shape, $B_r$ represents a background rate estimate, and $\Delta t$ represent change in time period. Each shape is a spectrum with a total count of 1. The LRT matched filter algorithm calculates the likelihood of each measurement given Poisson statistics as represented by the following equation:

$$P(X \mid H) = \frac{\prod_i \exp(-h_i) h_i^{x_i}}{x_i!}$$

where $h_i$ represents the i-th element of the hypothesis. The ratio of the two hypotheses results in the factorial terms canceling. The LRT matched filter also takes the log to convert the exponentials into sums. The resulting LRT may be represented by the following equation:

$$LRT(X) = \log\left(1 + \frac{k}{\sqrt{B_r \Delta t}} \frac{S_s}{B_s}\right)^t X - \frac{k}{\sqrt{B_r \Delta t}} = T^t X + M$$

The resulting LRT is based on a two-sided test, while other matched filters may be based on one hypothesis tests with normal statistics. Thus, the resulting LRT may be transformed by subtracting the mean with expected background and dividing by the expected noise for the estimated background. The result represents a one hypothesis test for background. The expected background rate is needed to generate the metric. As a result, the metric may be represented by the following equation:

$$DM = \frac{(T^t X + \kappa B_r \Delta t)}{\sqrt{\nu B_r \Delta t}}$$

where DM represents the metric and K represents a bias term (or penalty) for any difference in the estimated total count in the background and an expected background total count in the background. Bias term is an adjustment that may be made observationally based on the trust a background estimate. If a simulation with a known statistically distribution (truth) is run and random draws are used to form an estimate, there can be a bias term. If this bias term is in the negative direction, a source will be detected more often than expected. Thus, a bias term is added to account for the differences between truth (the actual expected background) and the estimate background. An LRT matched filter is only optimal for a target time window and single intensity. These target values are supplied to the metric trainer.

The LRT matched filter follow a behavior model given as $$D = \frac{\epsilon S_{Mc}}{\sqrt{B_{Mc}}} + \sigma^2$$

where $\epsilon$ represents the detection efficiency for the source S, $S_{Mc}$ represents the number of source counts in a measurement, $B_{Mc}$ represents the number of background counts in a measurement, and $\sigma^2$ represents a position variable drift term that depends on how well the current expected background matches the previous expected background. The hybrid matched filter may be a better performer than the standard gross count metric when properly tuned because the position dependent drift is always smaller than that of the gross count metric.

Targeted NSCRAD Algorithm

NSCRAD Algorithm

The Nuisance-Rejection Spectral Comparison Ratio Anomaly Detection ("NSCRAD") algorithms were developed by the Pacific Northwest National Laboratory. The NSCRAD algorithm first converts a measurement into a set of regions of interest and applies a transform to remove the expected background vector. Because the regions of interest may be overlapping, the NSCRAD algorithm factors in a correlation matrix estimated from background samples.

Given a region of interest feature vector $X \in \mathbb{R}^n$ and a region of interest background vector $B=[b_i]$, the NSCRAD transform $\alpha$ is an $\mathbb{R}^{n-1 \times n}$ may be represented by the following equation:

$$\alpha = \begin{bmatrix} 1 & -\frac{b_1}{b_2} & 0 & \cdots & 0 \\ 1 & 0 & -\frac{b_1}{b_3} & \ddots & 0 \\ \vdots & \vdots & \ddots & \ddots & \vdots \\ 1 & 0 & 0 & \cdots & -\frac{b_1}{b_n} \end{bmatrix}$$

Because the regions of interest may be overlapping, an estimate of the covariance $\Sigma$ is employed.

In addition to the removal of the background components, the NSCRAD algorithm may employ a subspace projection matrix $\gamma$. The NSCRAD algorithm computes from a matrix of background sources $N \in \mathbb{R}^{n \times m}$. The NSCRAD algorithm calculates a subspace projection transform as represented by the following equation:

$$\gamma(N) = (I - N(N^t N)^{-1} N^t)$$

Because the feature vectors are projected and are not independent, the NSCRAD algorithm may use an oblique subspace projection. The transformed covariance matrix may be represented by the following equation:

$$\beta = (\alpha \Sigma \alpha^t)^{-1} \alpha$$

where $\Sigma$ represents covariance. The NSCRAD algorithm adjusts the subspace projection to remove the background as represented by the following equation:

$$\gamma(N;\alpha,\beta) = (I - \alpha N(N^t \beta^t \alpha N)^{-1} N^t \beta^t)$$

Many different algorithms may be developed from these transforms. The NSCRAD algorithm may be represented by the following equation:

$$DM = X^t (\beta^t \gamma \alpha) X$$

This is a classical quadratic form where $Q=\beta^t\gamma\alpha$. This metric will have $\chi^2$ statistics with the number of degrees of freedom given by the number of energy features minus one for the removal of background and minus the number of background sources removed. An implementation of the NSCRAD algorithm may be as described as follows:

---

Let $\hat{B}$ be a feature vector with unit counts
Let $\hat{\Sigma}$ be a covariance estimate per unit count
Let $\lambda$ be a forgetting factor
Let a subspace projection to eliminate the background be $\gamma(N;\alpha,\beta) =$
$I - \alpha N (N^t \beta^t \alpha N)^{-1} N^t \beta^t$
For each measurement X
For each region of interest in regions of interest Y of X
Compute $\alpha$ as SCR transform for $\hat{B}$
Compute $\beta$ from the covariance estimate $\hat{\Sigma}$ and $\alpha$, with $\beta = (\alpha\hat{\Sigma}\alpha^t)^{-1} \alpha$ Compute decision metric $DM = \dfrac{Y^t \beta^t \gamma(N;\alpha,\beta)\alpha Y}{|X|_1}$ If (m < threshold) revise the background estimates Update $\hat{\Sigma} = \lambda\hat{\Sigma} + \dfrac{(1-\lambda)}{|X|_1}(Y - \hat{B}|X|_1)(Y - \hat{B}|X|_1)^t$ Update $\hat{B} = \lambda\hat{B} + \dfrac{(1-\lambda)}{|X|_1}Y$

---

Since the NSCRAD algorithm has a quadratic form, the aggregation is performed on a spectral comparison ratio ("SCR") vector and the projected SCR vector, rather than simply the numerator and denominator in other algorithms. As a result, the amount of memory that is needed increases when aggregating measurements spatially. Thus, an NSCRAD algorithm might be appropriate when using temporal aggregation but might not be appropriate when using spatial aggregation.

The NSCRAD algorithm has inherently $\chi^2$ statistics. As such, it may not work with the metric aggregation as described below. The NSCRAD algorithm only removes a single dynamic degree of freedom as well as a specified number of fixed background dimensions. This approach reduces the complexity of the background estimator but may result in a reduction in the systematic variability attenuation. As such, the maximum aggregation time is limited for large detectors. The NSCRAD algorithm may suffer from poor statistical distributions when the total counts are low. This tendency requires increasing the threshold about the level expected by $\chi^2$ statistics in some cases.

NSCRAD Matched Filter

An NCRAD matched filter, unlike the NSCRAD algorithm, has statistics with unit variance and normal distributions. As a result, the tendency to have outliers is reduced and there is an increase in the systematic variance rejection leading the wider range of operation. A down side of this approach is the regions of interest that optimize the performance are different for each target source. Thus, every detection metric evaluator needs to be paired with a corresponding metric trainer. An implementation of the NSCRAD matched filter is the same as that for the NSCRAD algorithm except that for each region of interest the matched filter coefficients are calculated as represented by the following equation:

$$G = S^t\beta^t\gamma(N;\alpha,\beta)\alpha$$

and the decision metric is represented by the following equation:

$$m = \dfrac{GY}{\sqrt{|X|_1}}.$$

Unlike the NSCRAD algorithm, the NSCRAD matched filter generates a metric for one source signature. To cover a range of sources with a filter, a description of the source signatures covering the sources to be detected is needed.

Metric Aggregation

The aggregate metrics component may aggregate metrics spatially or temporally. Many spectral detection algorithms aggregate in a fixed time window. A spatial aggregation technique generates an aggregate metric from measurements collected at the same location but at different times (e.g., a detector makes multiple sweeps over an area). A temporal aggregation technique generates an aggregate metric for each time interval based on the immediate prior time intervals. The aggregate metrics component may employ a variety of aggregation techniques to generate the aggregated metrics. When the RDA system employs multiple aggregation techniques, the aggregation metric component generates aggregated metrics for each aggregation technique. The evaluate metrics component may use the maximum of the aggregated metrics to detect whether a source is present.

A temporal aggregation technique employs a rolling window of measurements when generating the aggregated metrics. The aggregation component generates an aggregated metric for multiple rolling windows that each contains a different number of measurements.

A spatial aggregation technique may apply a weighted back projection method assuming a simple $1/R^2$ kernel to generate the aggregated metric.

Metric Standardization

The generate metric component may employ a metric standardization technique to correct the statistical distribution of detection algorithms that produce standard normal distribution on their individual metrics. The metric standardization technique maintains a running estimate of the recent mean and variance of each of the metrics. From this running estimate, the metric standardization technique computes the deviation in mean from zero (bias) and the excess variance. The metric standardization technique then corrects the detection metric to remove this bias and reduce the variance.

The metric standardization technique may employ a bias forgetting factor and variance forgetting factor. The metric standardization technique employs these factors in a first order infinite impulse response filter to maintain the bias and variance estimates. The smaller the number the slower the algorithm will learn about changes in conditions. For example, the forgetting factors may be on the order of 0.01 which means that the metric standardization technique learns changes on the order of 100 measurements. These forgetting factors may be smaller when the background is very stationary and larger when the background is highly varying. The bias and variance forgetting factors may have the same or different values. The metric standardization techniques may exclude metrics that clearly contains a source when calculating these bias and variance estimate. For example, metrics that exceed a threshold may be excluded.

Measurement Calibration

The RDA system calibrates measurements to account for the drift in a sensor of a detector during its collection of photons. The drift results in photons of one energy level to be identified as different energy levels and may scale the spectrum to be wider or narrower. To account for this drift, the calibrate measurements component allocates counts from the measurement bins to different bins referred to changing the binning structure of the measurement or rebinning. To identify the characteristics of the drift, the radiation source detector may periodically collect from the detector calibration measurements of a known source and/or measurements from background. A calibrate measurements component identifies the calibration that is needed by comparing the calibration measurements to the expected measurements of the known source to determine the drift. For example, if the source signature of the known source and the calibration measurements have corresponding peaks in different bins, the count of the measurement needs to be re-allocated based on the difference in the bins. For example, in a simple case, the measurement may have the exact shape as the source signature except that because of the drift the measurement is shifted by one bin to a lower energy level. The calibration component may also correct for nonlinearities in the detector response including those intrinsic to the photon absorber and those from the amplifier. These nonlinearities are generally captured in characterizations measurements made prior to deployment and provided in the form of polynomial or spline coefficients, or energy/channel pairs.

In some embodiments, strong measurements of sources with well isolated features can be used to monitor, and in some cases provide additional corrections to the nonlinearities. To accomplish this, each source signature is augmented with a lookup table with the effective energy for each feature (e.g., gamma-ray emission line or Compton edge) in the source signature that is useful for calibration. The effective energy is the energy that would be found for a perfectly measured source signature that takes into account shifts from the true energy due to the impact of shielding and scattering on the feature position extraction procedure (e.g., centroiding or line fitting). In addition to the effective energy, the expected range of effective energies (e.g., standard deviation) is listed in the table along with the range of ratio of the counts in the peak to those in the entire spectrum. The effective energy, range of effective energy, and peak-to-total count ratio can all be a function of the signal-to-noise ratio of the measurement and the total number of counts in the measurement. These dependencies are included in the lookup table of a source signature. Settings for the feature extraction procedures (e.g. regions of interest) are also included in the lookup table. Some source signatures, such as those with high amounts of shielding or for nuclides without well-defined features, will be unsuitable for calibration monitoring and correction and will not have any effective energies and related values included.

When a source is detected with a sufficiently high decision metric and source identification probability, the effective energy for each feature is calculated and compared with those in the lookup table of the source signature. If the extracted energy differs from the effective energy listed in the lookup table significantly more than the expected range for the measurement conditions encountered, then a flag can be set to indicate a calibration problem (calibration monitor), and/or the information can be used to update the energy scale (calibration correction). The measured peak-to-total count ratio is also compared with an appropriate range in the lookup table to validate that the correct feature and source signature has been found regardless of energy scale. More than one measurement of the calibration error is required to trigger a correction. A corrected energy scale can then be generated using a constrained spline that maintains the overall shape of the nonlinearities from the more detailed and controlled pre-deployment calibration measurements for a specific detector, or for the detector type in general, but also adjusts to more closely match the measurements at the energies available.

To account for changes in the energy scale due to drift and nonlinearities, the calibrate measurements component re-allocates the counts of each bin of the measurement to the next higher energy level. As another example, the drift of the energy range may vary across the energy range such as counts in the lower energy bins may compressed into fewer bins while the counts in the higher energy bins may be expanded to more bins. As another example, when the counts of a bin of a measurement need to be allocated to multiple bins, there may be a correlation in the statistics of the data. This correlation may cause statistical analysis techniques to produce biases that can affect the detection metrics. To prevent such statistical biases, the calibrate measurements component employs a statistical rebinning method. For example, the calibrate measurements component may randomly select a binomial variable of number of counts in a bin of the measurement that need to be re-allocated to another bin. By introducing this randomness, the Poisson statistics of the rebinning is preserved. Nonlinearities correction may take into account environmental factors such as temperature, or operational factors such as count rate. Thus, the coefficients may be a function of these factors.

Figure 5:
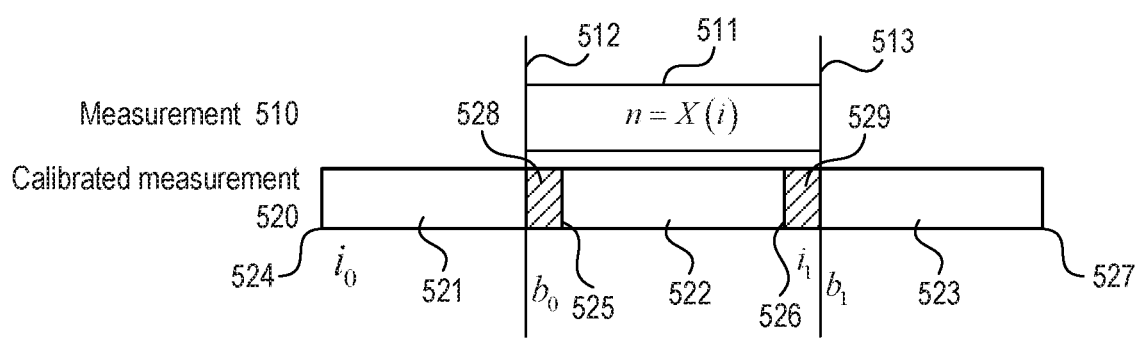
FIG. 5 illustrates calibrations of measurement based on a new binning structure.

FIG. 5 illustrates calibration of measurements based on drift in a detector. The measurement 510 includes an expanded bin 511 with expanded edges 512 and 513. The calibrated measurement 520 include bins 521-523 with edges 524-527 specified by the binning structure. The calibrated measurement represents a compression in the scale of the measurement. Bin 511 overlaps bins 521-523. To distribute the counts of bin 511 to bins 521-523, the calibrate measurements component allocates a fraction of the count of bin 511 to bin 521. The fraction is based on ratio of the energy range 528 to the energy range of bin 511. Similarly, the fraction of counts corresponding to energy range 529 are allocated to bin 523. The remaining count are allocated to bin 522. Rather than using the exact fraction number of counts, the calibrate measurements component may select the number of counts based on a binomial distribution for that fraction number of counts.

Dynamic Background Estimation

The RDA system provides for the dynamic estimation of the background in measurements. When a detector is moving, the measured background can vary significantly (e.g., by a factor of five). A gross count algorithm such as a gross counts k-sigma algorithm will be dominated by these variations and have little sensitivity to weak sources. Spectral detection algorithms detect sources by looking for changes in spectral signature rather than in overall intensity. Thus, spectral detection algorithms are trained with a set of representative backgrounds for the region to be measured. Such representative backgrounds are typically developed based on collecting many hours of background data that is used as a fixed background training set.

The generating of representative backgrounds may be difficult in some cases. For example, when a detector is to be deployed to a new area, it may not be practicable to collect background data. Also, the response of a detector may change over time. These changes can include gain drifts, changes in non-linearity response, and changes in energy resolution and efficiency. The calibrate measurements component will correct gain drifts but is limited in correcting other changes in the detector response. As a result, a representative background generated from background data collected on one day may not represent the background detected on another day. To make detection sensitivity and false positive rates more reliable, robust, and predictable, the RDA system may use dynamic background estimation that is trained "on the fly" during normal operations.

Since the RDA system receives measurements from detectors that are not only measuring background but also measuring sources, the estimate background components excludes the contributions of the source. These sources can include intentional sources, unknown sources found as part of a source search, and chance encounters with sources that are commonly found in the environment (e.g., medical). To improve the estimated background, the estimate background component recognizes when a measurement represents a chance source and excludes those measurements when generating the estimated background. The RDA system employs a veto component that analyzes the metrics to decide which measurements to exclude. It is possible that a measurement of a source may not be excluded. For example, if the source is present when the detector starts collecting measurements or if the radiation from the source gradually increases, the source may not be detected and thus not be excluded. As a result, a small amount of the source signature could be incorporated into the background, desensitizing the background estimate to this source. In such a case, a measurement of the source based on a slightly larger intensity would not be recognized as a source and moreover would not be excluded.

To prevent such sources from not being detected and thus not excluded, the RDA system employs a sensitivity tester. Periodically, the sensitivity tester checks the sensitivity to a large number of sources by injecting the source with varying intensities into the estimated background to generate test measurements. The sensitivity tester then runs the detection algorithms with the estimated background generated by a background estimation component against the test measurements to determine the minimum intensity of a source that is required for detection. The sensitivity tester compares this minimum intensity against previous minimum intensities to determine whether the sensitivity has been compromised. If so, the estimate background component is restarted to generate a new estimated background.

Rank Average

The rank average algorithm generates a background rate for every measurement that is received. The RDA system may use a rank average algorithm with gross count detection algorithms when operating conditions in which the background of a measurement is temporarily decreased or increased. For example, when an object (e.g., truck) passes the detector, the background rate may decrease, and when the detector passes a structure (e.g., building) that contains a source, the background rate may increase.

To account for the temporary decrease or increase in background, the rank average algorithm, sorts the total counts of each measurement collected over a certain time period. The rank average algorithm then generates an average of the top (or bottom) counts. This average is a biased estimate of the background. Using standard statistical assumptions, the rank average algorithm calculates the bias factor. The rank average algorithm then corrects the biased estimate based on the bias factor. For example, the rank average algorithm may calculate an expected offset for a Gaussian distribution in the average total counts and subtract that offset from the estimated background.

The rank average algorithm may be particularly useful when a detector is stationary, when the background is being suppressed by nearby objects, and when an estimated background is needed in the absence of those objects.

Progressive Projection

The RDA system employs a progressive projection algorithm estimating a set of background vectors that span through linear combinations of all possible background shapes. This spanning set is referred to as a basis—although the background vectors are not orthogonal. The progressive projection algorithm queues background measurements (i.e., a measurement with no source detected) until either there is a change in the spectral shape of the background measurement or a certain minimum time has elapsed. The progressive projection algorithm then compares the background measurements with the changed spectral shape to the current basis vectors to determine which basis vector it best represents. If background measurement is found to not be strongly associated or disassociated with any of the existing basis vectors, that background measurement represents nothing of novel about the background. Conversely, if it is found to be strongly associated with or dissociated with a basis vector, the progression projection algorithm averages that background measurement into the existing basis vector. The progression projection algorithm then tries to maximize the eigenvalues associated with a correlation matrix formed by the basis vectors such that the basis vectors have maximum diversity. The progressive projection algorithm employs a forgetting function so that if the background measurements are the same for a long duration, the progressive projection algorithm does not update the basis vectors so that they do not become collinear.

The progressive projection algorithm may initialize the basis vectors from the background measurements collected after the algorithm is started or cleared. If detector is exposed to a source during initialization, that source may be trained into the basis vectors and thus become insensitive until a sensitivity tester is activated. The progressive projection may have three starting methods. A hot start method uses a set of predefined basis vectors specified in configuration data. A warm start method generates an average of the background measurements over a specified period and then mixes the average with predefined background measurements from the configuration data (or a previous run). A cold start method takes the average over the specified period and then injects known background measurements.

Each start method has different advantages and disadvantages. The cold start method is robust in the sense that it will operate even if there is a source present collocated with the detector so long as that source is not removed. But this robustness comes at the cost that the method may take a prolonged period before it becomes fully trained and thus reaches full sensitivity. If the known background measurements of the cold start method do not accurately reflect the variability in the background measurements, then the RDA system may not correctly detect sources and need to be restarted. The warm start method uses previous background measurements and thus becomes trained quickly. However, if the background measurements are very different from the previous background measurements (e.g., a source is present in the background measurements), the progressive projection algorithm will become insensitive to that source and need to be restarted. A hot start method can immediately generate the basis vectors. However, if the background measurements are not represented by the predefined basis vectors, the RDA system may generate false positives, that is, a background measurement is indicated as having a source present. As a result, the progressive projection algorithm will not update the basis vectors and the false positives will continue and need to be restarted using the cold start method or the warm start methods.

Classification

In some embodiments, the generate metrics component employs an identification algorithm that is similar to the OSP match filter detection algorithm but differs in the normalization term. The generated metrics component calculates the expected variance $\Sigma_B$ in each channel using the expected background calculated prior to the measurement. If mixtures of source signatures of a source are considered, the generate metrics component calculates the mixture of the source signatures for each source that optimally solves $\Sigma_B X = \Sigma_B A x$ to create a mixed source signature $S=Ax$. If mixtures are not considered, the generate metrics component uses each source signature $S_i$.

For each source signature (mixed or not mixed), the generate metrics component calculates a transform as represented by the following equation:

$$Q_i = \frac{S_i^t \Sigma_B^{-1}(I - B(B^t \Sigma_B^{-1} B)^{-1} B^t \Sigma_B^{-1})}{\sqrt{S_i^t \Sigma_B^{-1}(I - B(B^t \Sigma_B^{-1} B)^{-1} B^t \Sigma_B^{-1}) S_i}}$$

where $Q_i$ represents the transform. The generate metrics component than applies this transform to the measurement as represented by the following equation:

$$k_i = Q_i \cdot X$$

where $k_i$ represents the score.

The generate null-hypothesis component calculates the variance $\Sigma_Y$ of the measurement using the expected background. The generate the null-hypothesis component generates the variance of each metric and the covariances of the metrics using the following equations.

$$\sigma_i^2 = Q_i \Sigma_X Q_i^t$$

$$c_{ij} = Q_i \Sigma_X Q_j^t$$

where $\sigma_i^2$ represents the variance of $S_i$ and $c_{ij}$ represents the covariance of $S_i$ and $S_j$. The generate null-hypothesis component selects that largest of the variance to for the null hypothesis. The generate null-hypothesis component then calculates the metric for the null hypothesis based on the maximum of a random walk around zero with a fixed number of draws as represented by the following equation:

$$k_{null} = \sigma_m \left( \sqrt{\log \frac{n^2}{2\pi \log\left(\frac{n^2}{2\pi}\right)}} \cdot \left(1 + \frac{\gamma}{\log n}\right) \right)$$

where $k_{null}$ represents the metric, n represents the number of hypothesis times one over the desired probability of incorrectly identifying that a source is present, and $\gamma$ represents the Euler-Mascherioni constant. (See, David and Nagaraja, "Order Statistics," John Wiley & Sons, § 10.5, 2004.) The generate null-hypothesis component calculates the variance of the null hypothesis as the average of the variances of the metrics.

Computing System

The computing systems (e.g., network nodes or collections of network nodes) on which the RDA system and the other described systems may be implemented may include a central processing unit, input devices, output devices (e.g., display devices and speakers), storage devices (e.g., memory and disk drives), network interfaces, graphics processing units, cellular or other radio link interfaces, global positioning system devices, inertial navigation, and so on. The input devices may include keyboards, pointing devices, touch screens, gesture recognition devices (e.g., for air gestures), head and eye tracking devices, microphones for voice recognition, and so on. The computing systems may include high-performance computing systems, cloud-based servers, desktop computers, laptops, tablets, e-readers, personal digital assistants, smartphones, gaming devices, servers, and so on. For example, the simulations and training may be performed using a high-performance computing system, and the classifications may be performed by a mobile device that is part of the network node. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the RDA system and the other described systems. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The RDA system and the other described systems may be described in the general context of computer-executable instructions, such as program modules and components, executed by one or more computers, processors, or other devices. Generally, program modules or components include routines, programs, objects, data structures, and so on that perform tasks or implement data types of the RDA system and the other described systems. Typically, the functionality of the program modules may be combined or distributed as desired in various examples. Aspects of the RDA system and the other described systems may be implemented in hardware using, for example, an application-specific integrated circuit ("ASIC") or field programmable gate array ("FPGA").

Flow Diagrams

Figure 6:
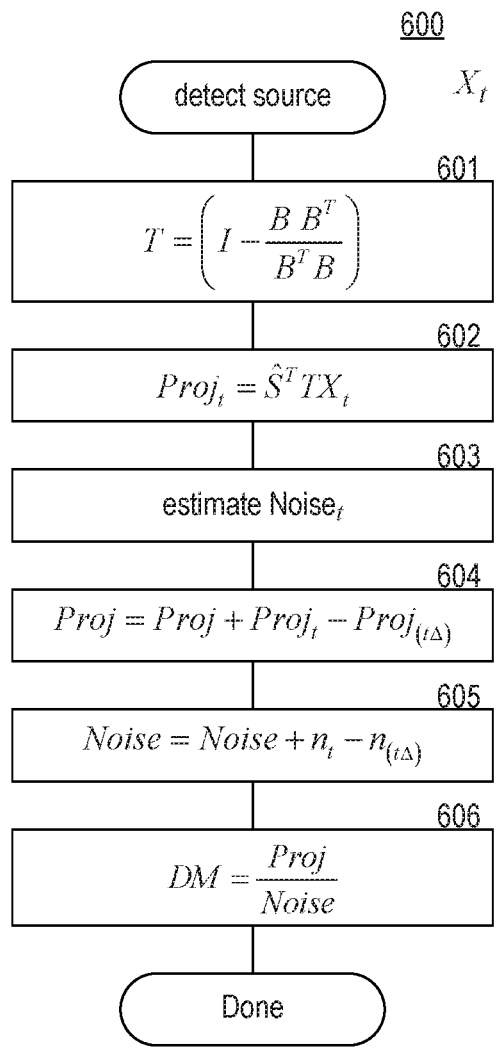
FIG. 6 is a flow diagram that illustrates high-level processing of an OSP match filter component of the RDA system in some embodiments.

FIG. 6 is a flow diagram that illustrates high-level processing of an OSP match filter component of the RDA system in some embodiments. The component 600 is invoked passing an indication of measurement $X_t$ for time t and a source definition Ŝ. In block 601, the component calculates a transform projection T that is complimentary to the background B. In block 602, the component calculates a partial projection of $X_t$ with the background removed onto the source definition Ŝ. In block 603, the component estimates the partial noise for $n_t$ time t. In block 604, the component updates the projection for a moving window to add in the partial projection for time t and subtract the partial projection for time t–Δ. In block 605, the component updates the noise for the moving window to add in the partial noise for time t and subtract the partial noise for time t–Δ. In block 606, the component calculates the detection metric as the projection divided by the noise. The component then completes.

Figure 7:
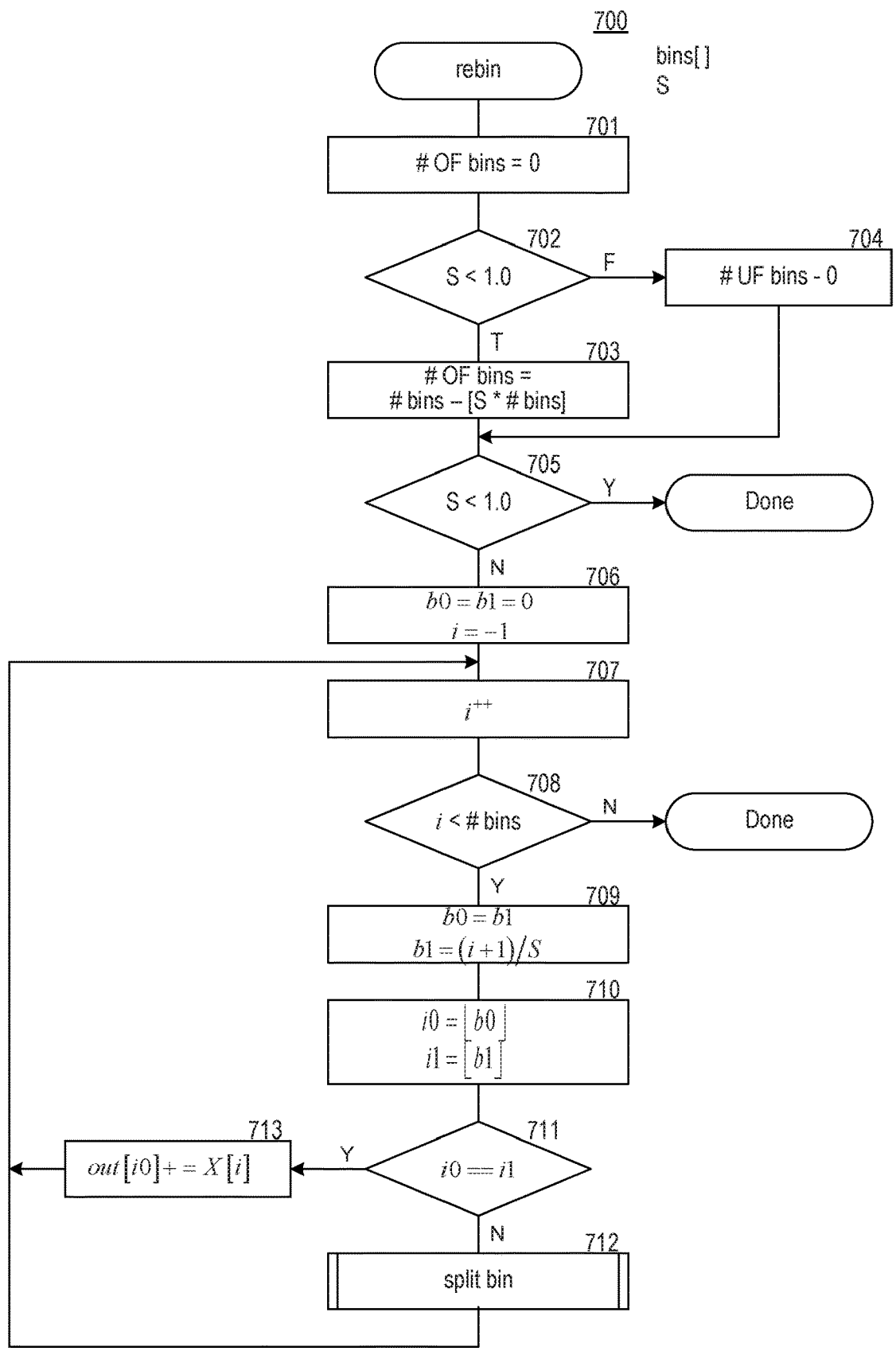
FIG. 7 is a flow diagram that illustrates the process of a calibrate component of the RDA system in some embodiments.

FIG. 7 is a flow diagram that illustrates the process of a calibrate component of the RDA system in some embodiments. The component 700 is invoked to revise the existing bins based on the drift of a sensor of the radiation detector in the detection of the energy of the signals. The component is invoked passing an indication of the edges and measurements of the current bins and a scale s. In blocks 701-205, the component initializes the number of overflow bins (#OFbins) and underflow bins (#UFbins). In block 701, the component sets the number of overflow bins to 0. In decision block 702, if the scale is less than 1.0, then the component continues at block 703, else the component continues at block 704. In block 703, the component sets the number of underflow bins to the number of bins (#bins) minus the floor of the number of bins multiplied by the scale. In block 704, the component sets the number of underflow bins to 0. In decision block 705, if the scale equals 1.0, then no rebinning is needed and the component completes, else the component continues at block 706. In block 706, the component initializes variables b0 and b1 to track the energy of the bin edges and an index i for the bins. In block 707-713, the component loops performing the rebinning. In block 707, the component increments the index i to the next bin. In decision block 708, if all the bins have already been indexed, then the component completes, else the component continues at block 709. In block 709, the component set b0 to the current edge and b1 to the next edge. In block 710, the component sets index i0 and i1 to the flow of index b0 and index b11, respectively. In decision block 711, if index i0 equals index i1, then the component continues at block 713, else the component continues at block 712. In block 712, the component invokes a split bin component to split the bins and loops to block 707 to select the next bin, else the component continues at block 713. In block 713, the component increments the count of the new bin out[i0] by the counts of the measurement X[i] and loops to block 707 to select the next bins.

Figure 8:
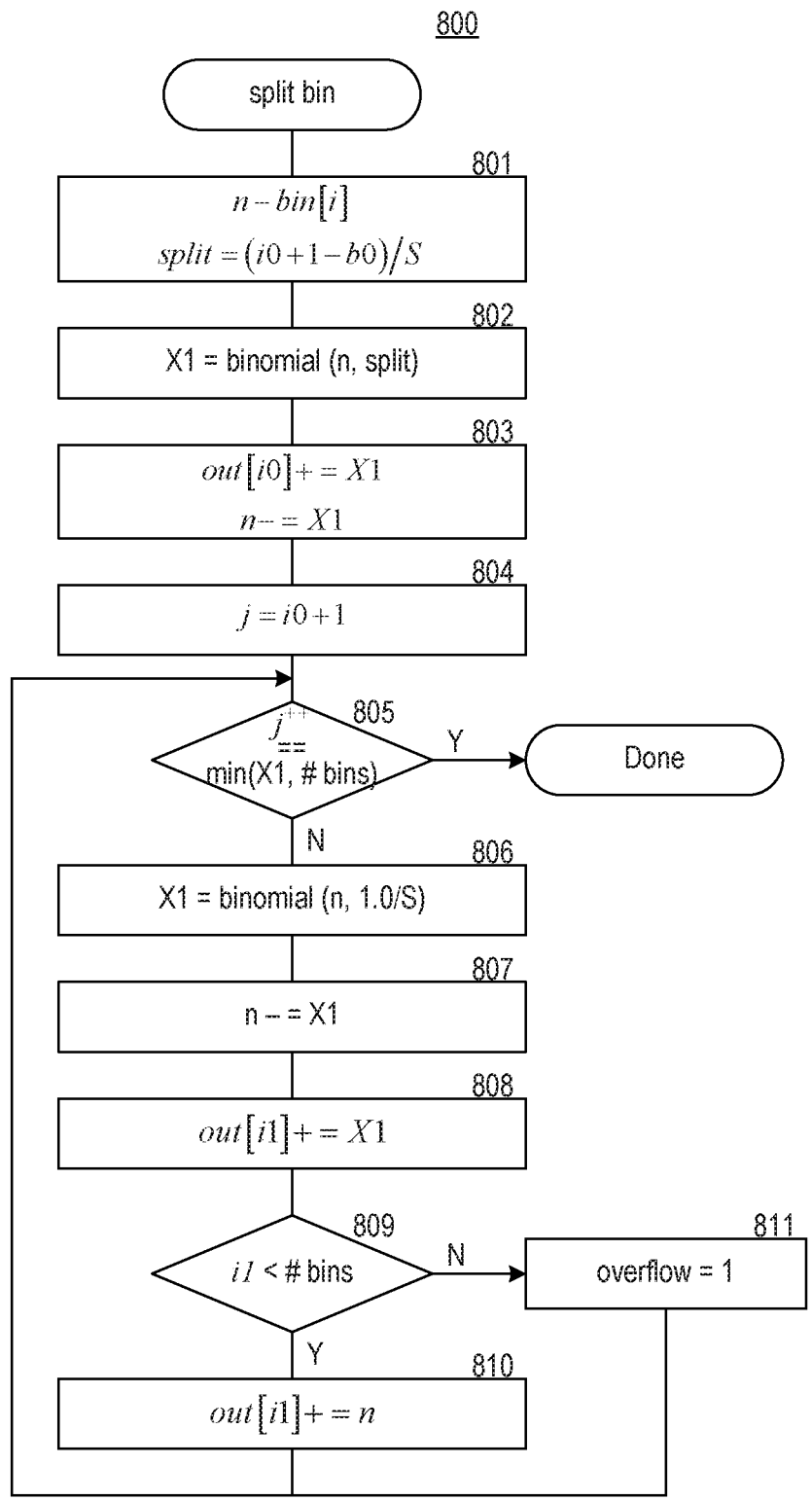
FIG. 8 is a flow diagram that illustrates the processing of a split bin component of the RDA system in some embodiments.

FIG. 8 is a flow diagram that illustrates the processing of a split bin component of the RDA system in some embodiments. The component 800 is invoked to split a bin. In block 801, the component sets the variable n to the counts of bin[i] and the variable split to the fraction of those counts for allocation to out[i0]. In block 802, the component applies a binomial distribution to select the number of counts x1 to be added to out[i0] based on the variables n and split. In block 803, the component adds the count x1 to out[i0] and decrements the remaining counts of variable n by counts x1. In block 804, the component sets index j to index i0 plus 1. In decision block 805, if variable j is greater than the minimum of variable x1 and the number of bins #bins, then the component completes, else the component increments variable j and continues at block 806. In block 806, the component sets the variable x1 to a value based on a binomial distribution of the variable n and 1.0 divided by the scale s. In block 807, the component decrements the variable n by the variable x1. In block 808, the component increments the count of out[i1] by the variable x1. In decision block 809, if index i1 is less than the number of bins, then the component continues at block 801, else the component continues at block 811. In block 810, the component increments out[i1] by the variable n and loops to block 805. In block 811, the component sets the count of the overflow to variable n and loops to block 805.

Figure 9:
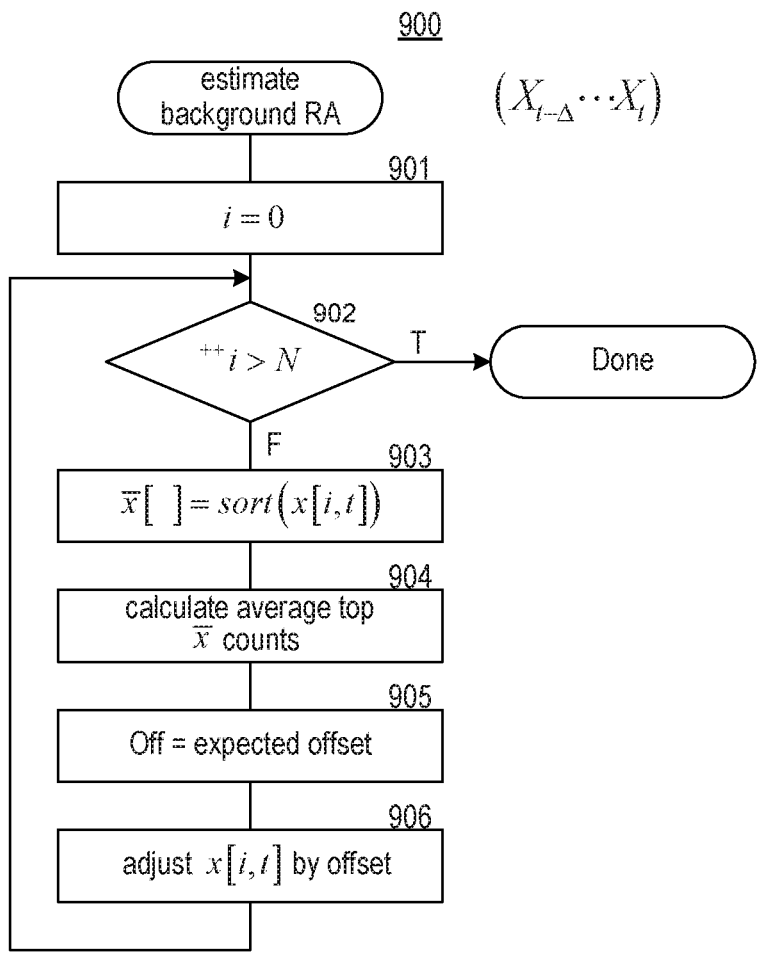
FIG. 9 is a flow diagram that illustrates the processing of an estimate background based on rank average component of the RDA system in some embodiments.

FIG. 9 is a flow diagram that illustrates the processing of an estimate background based on rank average component of the RDA system in some embodiments. The component 900 is invoked to adjust the estimate of the background. In block 901, the component initializes a variable i to index through the bins. In decision block 901, the component increments the variable i and if greater than the number of bins, the component completes, else the component continues at block 903. In block 903, the component creates a sort of the counts within the moving window for the indexed bin. In block 904, the component calculates the average of the top counts. In block 905, the component calculates an expected offset for the top counts based on the average. In block 906, the component adjusts the counts for the indexed bins by the offset and loop to block 902 to select the next bin.

The following paragraphs describe various embodiments of aspects of the RDA system and other systems. An implementation of the systems may employ any combination of the embodiments. The processing described below may be performed by one or more computing systems with processors that executes computer-executable instructions stored on a computer-readable storage medium that implements the system.

In some embodiments, one or more computing systems for identifying a source of radiation is provided. The one or more computing system comprise one or more computer-readable storage mediums storing computer-executable instructions and one or more processor for executing the computer-executable instructions stored in the one or more computer-readable storage mediums. The instructions implement a radiation source detector that receives measurements of radiation; for one or more sources, generates a detection metric indicating whether that source is present in the measurements; and evaluates the detection metrics to detect whether a source is present in the measurements. The instructions also implement a radiation source identifier that, when the presence of a source in the measurements is detected, for one or more sources, generates an identification metric indicating whether that source is present in the measurements; generates a null-hypothesis metric indicating whether no source is present in the measurements; and evaluates the one or more identification metrics and the null-hypothesis metric to identify the source, if any, that is present in the measurements. In some embodiments, the radiation source detector generates the detection metric for a source based on a detection source signature for that source and the radiation source detector generates the identification metric for a source based on a plurality of identification source signatures for that source. In some embodiments, the identification sources signatures for a source represent that source with different shieldings. In some embodiments, the radiation source identifier identifies a radiation source class for an identified source. In some embodiments, the measurements are calibrated to account for drift in the detector that collected the measurements. In some embodiments, the radiation source identifier generates an aggregated metric for each source. In some embodiments, the measurements with in a window are aggregated and radiation is detected and identified based on aggregated measurements.

In some embodiments, a method performed by a computing system for detecting presence of a source of radiation from a measurement of radiation. For one or more sources and for one or more detection algorithms for each source, the method generates a metric using that detection algorithm wherein the metric indicates similarity between a current measurement and a source signature for that source and wherein that detection algorithm factoring in an estimate of background radiation generated based on prior measurements to the current measurement; and generates an aggregated metric for that source from one or more metrics for that source. The method analyzes the aggregated metric for one or more sources to determine whether a source is likely present in the current measurement. The method, upon determining that a source is likely present in the current measurement, indicates that the presence of a source has been detected. In some embodiments, the method further generates an estimate of background radiation based on prior measurements excluding prior measurements for which the presence of a source was detected. In some embodiments, estimate of background radiation is a weighted average based on a measurement and a prior estimate of background radiation. In some embodiments, a source signature is associated with an identification of a source and a shielding of the source. In some embodiments, for each detection algorithm, the method generates a metric for each source signature associated with a source. In some embodiments, a measurement is represented by a histogram of energy ranges with a count of photons for each energy range. In some embodiments, a metric is generated for each of a plurality of windows measurements, each window including the current measurement and a number of adjacent prior measurement. In some embodiments, a detection algorithm is associated with coefficients and the method further dynamically adjusts the coefficients based on an estimate of background radiation. In some embodiments, the analyzing of the aggregated metrics includes applying a classifier that is trained using training data that includes feature vectors with features that include detection algorithm, a window size, and an aggregated metric and a label for each feature vector indicating whether a source is present. In some embodiments, the feature vectors are generated from collected measurements of radiation. In some embodiments, the feature vectors are generated from simulated measurements of radiation. In some embodiments, the method further calibrates the current measurement to account for drift associated with a detector used to collect the measurements.

In some embodiments, a method performed by a computing system is provided for identifying a source of radiation from a measurement of radiation. The method receives a current measurement for which presence of a source has been detected based on detection source signatures. For each of a plurality of identification source signatures, the method generates a metric using an identification algorithm. The metric indicates similarity between a current measurement and a source signature for that source. The identification algorithm factors in an estimate of background radiation generated when detecting the presence of the source. The identification source signatures being more comprehensive than the detection source signatures. For each source, the method generates a source metric based on one or more metrics generated using a source signature for that source. The method generates a null-hypothesis metric indicating similarity between the current measurement and the estimate of background radiation. The sources and the estimate of background radiation are targets. The source metrics and the null-hypothesis metric are target metrics. For each target, the method generates a target probability representing presence of that target in the current measurement. The target probability is based on the target metric for that target. In some embodiments, the method, for each of a plurality of radiation source classes, generates a radiation source class probability that the current measurement represents a source of that radiation source class. The radiation source class probabilities is generated based on target probabilities. In some embodiments, the generating of a target probability factors in prior probabilities for each target. In some embodiments, the identification algorithm is based on an orthonormal subspace projection matched filter algorithm.

Orthonormal Subspace Projection Matched Filter Algorithm

In some embodiments, a method performed by one or more computing systems is provided for generating a metric relating to a source of radiation in measurements of radiation. The method accesses a source signature of the source, an estimated background, and background basis vectors. The method generates a projection vector based on the source signature, estimated background, and the background basis vectors. The method accesses a measurement. The method generates the metric based on the measurement, the projection vector, and an expected variance for the measurement. In some embodiments, the source signature is a histogram representing an energy range divided into energy bins, each energy bin having a value representing a count of photons emitted by that source over a time interval. In some embodiments, the generating of the projection vector includes generating a weighting matrix from the estimated background wherein a variance of each energy bin is based on the expected background. In some embodiments, the generating of the projection vector further includes generating source signature weighted projection and a background weighted projection and setting the projection vector to the difference between the source signature weighted projection and the background weighted projection. In some embodiments, a source signature represents a shielding of the source. In some embodiments, the method further generates aggregated measurements of different numbers of measurements and for each aggregated measurement, generates a metric based on the aggregated measurement, the projection vector, and an expected variance for the aggregated measurement. In some embodiments, the method, when the metric satisfies a source present threshold, indicates that presence of the source has been detected. In some embodiments, the method, when the metric satisfies a source present threshold, indicates that presence of the source has been semi-definitively detected. In some embodiments, the generating of the detection metric includes dividing the product of the projection vector and the measurement by the square root of the expected variance.

In some embodiments, one or more computing systems are provided for generating a metric relating to a source of radiation in measurements of radiation. The one or more computing systems comprise one or more computer-readable storage mediums storing computer-executable instructions and one or more processors for executing the computer-executable instructions stored in the one or more computer-readable storage mediums. When executed, the instructions access a source signature of the source, an estimated background, and background basis vectors. The instructions generate a projection vector based on the source signature, estimated background, and the background basis vectors. The instructions access a measurement. The instructions generate the metric based on the measurement, the projection vector, and an expected variance for the measurement. In some embodiments, the source signature is a histogram representing an energy range divided into energy bins, each energy bin having a value representing a count of photons emitted by that source over a time interval. In some embodiments, the instructions that generate of the projection vector generate a weighting matrix from the estimated background wherein a variance of each energy bin is based on the expected background. In some embodiments, the instructions that generate the projection vector further generate source signature weighted projection and a background weighted projection and sets the projection vector to the difference between the source signature weighted projection and the background weighted projection. In some embodiments, a source signature represents a shielding of the source. In some embodiments, the instructions further generate aggregated measurements of different numbers of measurements and for each aggregated measurement, generate a metric based on the aggregated measurement, the projection vector, and an expected variance for the aggregated measurement. In some embodiments, the instructions further, when the metric satisfies a source present threshold, indicate that presence of the source has been detected. In some embodiments, the instructions further, when the metric satisfies a source present threshold, indicate that presence of the source has been semi-definitively detected. In some embodiments, the instructions that generates of the detection metric divides the product of the projection vector and the measurement by the square root of an expected variance.

In some embodiments, a method performed by one or more computing systems is provide for generating a metric relating to a source of radiation in measurements of radiation collected in sequence. The method accesses a source signature of the source, an estimated background, and background basis vectors. The method generates a projection vector as represented by the following equation:

$$T = S^t W(I - B(B^t W B)^{-1} B^t W)$$

where T represents the projection vector, S represents the source signature, B represents the estimated background, and W represents the background basis vectors. The method accesses a measurement. The method generates the metric by as represented by the following equation:

$$DM = \frac{TX}{\sqrt{|X|_1}}$$

where DM represents the metric, X represents the measurement and $|X|_1$ represents the expected variance for the measurement. In some embodiments, the method detects presence of a source of based on the metric. In some embodiments, the method identifies the source based on the metric. In some embodiments, the source signature is a histogram representing an energy range divided into energy bins, each energy bin having a value representing a count of photons emitted by that source over a time interval. In some embodiments, a source signature represents a shielding of the source. In some embodiments, the method generates aggregated measurements of different numbers of measurements and for each aggregated measurement, generates a metric based on the aggregated measurement, the projection vector, and an expected variance for the aggregated measurement.

Hybrid Matched Filter

In some embodiments, a method performed by one or more computing systems is provided for generating a metric relating to a source of radiation in measurements of radiation. The method accesses a source signature of the source and an estimated background. The method generates a background vector factoring out the source signature. The method generates a projection vector based on a weighting matrix derived from the estimated background and based on the source signature and the estimated background. The method accesses a measurement. The method generates the metric based on the measurement, the projection vector, and an expected variance an average background. In some embodiments, the source signature is a histogram representing an energy range divided into energy bins, each energy bin having a value representing a count of photons emitted by that source over a time interval. In some embodiments, the weighting matrix is generated from the estimated background wherein a variance of each energy bin is based on the expected background. In some embodiments, a source signature represents a shielding of the source. In some embodiments, the method generates aggregated measurements of different numbers of measurements and for each aggregated measurement, generates a metric based on the aggregated measurement and the projection vector. In some embodiments, when the metric satisfies a source present threshold, the method indicates that presence of the source has been detected. In some embodiments, when the metric satisfies a source present threshold, the method indicates that presence of the source has been semi-definitively detected.

In some embodiments, one or more computing systems are provided to generate a metric relating to a source of radiation in measurements of radiation. The one or more computing systems comprise one or more computer-readable storage mediums storing computer-executable instructions and one or more processors for executing the computer-executable instructions stored in the one or more computer-readable storage mediums. When executed, the instructions access a source signature of the source and an estimated background. The instructions generate a background vector factoring out the source signature. The instructions generate a projection vector based on a weighting matrix derived from the estimated background and based on the source signature and the estimated background. The instructions access a measurement. The instructions generate the metric based on the measurement, the projection vector, and an expected variance an average background. In some embodiments, the source signature is a histogram representing an energy range divided into energy bins, each energy bin having a value representing a count of photons emitted by that source over a time interval. In some embodiments, the weighting matrix is generated from the estimated background wherein a variance of each energy bin is based on the expected background. In some embodiments, a source signature represents a shielding of the source. In some embodiments, the instructions further generate aggregated measurements of different numbers of measurements and for each aggregated measurement, generate a metric based on the aggregated measurement and the projection vector. In some embodiments, the instructions further, when the metric satisfies a source present threshold, indicate that presence of the source has been detected. In some embodiments, the instructions further, when the metric satisfies a source present threshold, indicate that presence of the source has been semi-definitively detected.

In some embodiments, a method performed by one or more computing systems is provided for generating a metric for indicating presence of a source of radiation in measurements of radiation collected in sequence. The method accesses a source signature of the source, an estimated background, and background basis vectors. The method generates a projection vector as represented by the following equation:

$$T = k S^t W(I - \hat{B}(\hat{B}^t W \hat{B})^{-1} \hat{B}^t W)$$

where T represents the projection vector, S represents the source signature, W represents the basis vectors, $\hat{B}$ is represented by the following equation:

$$\hat{B} = (I - \mu S(S^t S)^{-1} S)$$

and k and μ represents variables adapted to produce a metric with a unit variance with represented by the following equation:

$$\mu = \overline{TB}$$

where $\overline{B}$ represents the average background. The method access a measurement. The method generates the metric by as represented by the following equation:

$$DM = \frac{TX - \mu \Delta t}{\sqrt{|B_t|_1}}$$

where DM represents the metric, X represents the measurement, t represents time of the measurement, $\Delta t$ represents change in time period, and $|B_t|_1$ represents the expected background at time t. In some embodiments, the source signature is a histogram representing an energy range divided into energy bins, each energy bin having a value representing a count of photons emitted by that source over a time interval. In some embodiments, a source signature represents a shielding of the source. In some embodiments, the method generates aggregated measurements of different numbers of measurements and for each aggregated measurement, generating a metric based on the aggregated measurement, the projection vector, and an expected variance for the aggregated measurement.

Bi-Dimensional ("BD") Matched Filter

In some embodiments, a method performed by one or more computing systems is provided for generating a metric relating to a source of radiation in measurements of radiation. accessing a measurement, a source signature of the source and an estimated background. The method generates a background vector factoring out the source signature. The method generates a projection vector based on a weighting matrix derived from the estimated background and based on the source signature and the estimated background. The method accesses a measurement. The method generates the metric based on the measurement, the projection vector, and an expected variance an average background. In some embodiments, the source signature is a histogram representing an energy range divided into energy bins, each energy bin having a value representing a count of photons emitted by that source over a time interval. In some embodiments, the weighting matrix is generated from the estimated background wherein a variance of each energy bin is based on the expected background. In some embodiments, a source signature represents a shielding of the source. In some embodiments, the method generates aggregated measurements of different numbers of measurements and for each aggregated measurement, generates a metric based on the aggregated measurement and the projection vector. In some embodiments, when the metric satisfies a source present threshold, the method indicates that presence of the source has been detected. In some embodiments, when the metric satisfies a source present threshold, the method indicates that presence of the source has been semi-definitively detected.

In some embodiments, one or more computing systems are provided for generating a metric relating to a source of radiation in measurements of radiation. The one or more computing systems comprise one or more computer-readable storage mediums for storing computer-executable instructions for controlling the one or more computing systems and one or more processors for executing the computer-executable instructions stored in the one or more computer-readable storage mediums. The instructions access a measurement, a source signature of the source and an estimated background. The instructions generate a background vector factoring out the source signature. The instructions generate a projection vector based on a weighting matrix derived from the estimated background and based on the source signature and the estimated background. The instructions access a measurement. The instructions generate the metric based on the measurement, the projection vector, and an expected variance an average background. In some embodiments, the source signature is a histogram representing an energy range divided into energy bins, each energy bin having a value representing a count of photons emitted by that source over a time interval. In some embodiments, the weighting matrix is generated from the estimated background wherein a variance of each energy bin is based on the expected background. In some embodiments, a source signature represents a shielding of the source. In some embodiments, the instructions further generate aggregated measurements of different numbers of measurements and for each aggregated measurement, generate a metric based on the aggregated measurement and the projection vector. In some embodiments, the instructions further, when the metric satisfies a source present threshold, indicate that presence of the source has been detected. In some embodiments, the instructions, when the metric satisfies a source present threshold, indicating that presence of the source has been semi-definitively detected.

In some embodiments, a method performed by one or more computing systems is provided for generating a metric for indicating presence of a source of radiation in measurements of radiation collected in sequence. The method accesses a source signature of the source, an estimated background, and background basis vectors. The method solves solving the following equation:

$$\begin{bmatrix} S & B \\ 0 & \lambda \overline{1} \end{bmatrix} \begin{bmatrix} s \\ b \end{bmatrix} = \begin{bmatrix} X \\ \lambda e_b \end{bmatrix}$$

where S represents the source signature, $\overline{1}$ represents a row vector of ones equal to the number of background components, s represents the estimated counts in the source, b represents a vector of background intensities in each component, B is a matrix of background basis vectors, X is measurement, $e_b$ is the estimated total count in the background, $\lambda$ is a tuning parameter based on reliability of the estimated background total counts. The method accesses a measurement. The method generates the metric by as represented by the following equation:

$$DM = \frac{s - \kappa \max(b - e_b, 0)}{\sqrt{e_b}}$$

where DM represents the metric and K represents a penalty for any difference in the estimated total count in the background and an expected background total count in the background. In some embodiments, the solving of the equation is an approximation represented by the following equation:

$$\begin{bmatrix} s \\ b \end{bmatrix} = X + e_b.$$

In some embodiments, the source signature is a histogram representing an energy range divided into energy bins, each energy bin having a value representing a count of photons emitted by that source over a time interval. In some embodiments, a source signature represents a shielding of the source. In some embodiments, the method further generates aggregated measurements of different numbers of measurements and for each aggregated measurement, generating a metric based on the aggregated measurement, the projection vector, and an expected variance for the aggregated measurement.

LRT Matched Filter

In some embodiments, a method performed by one or more computing systems is provided for generating a metric relating to a source of radiation in measurements of radiation. The method accesses a source signature of the source and an estimated background. The method generates a first hypothesis based on the estimated background and an estimated background rate. The method generates a second hypothesis based on the estimated background, the estimated background rate, and the source signature. The method generates a first likelihood for the first hypothesis given a Poisson distribution. The method generates a second likelihood for the second hypothesis given the Poisson distribution. The method generates a projection vector based on the first likelihood and the second likelihood. The method accesses a measurement. The method generates the metric based on the measurement, the projection vector, and the estimate background rate. In some embodiments, the source signature is a histogram representing an energy range divided into energy bins. Each energy bin has a value representing a count of photons emitted by that source over a time interval. In some embodiments, a source signature represents a shielding of the source. In some embodiments, the method further generates aggregated measurements of different numbers of measurements, generates a metric based on the aggregated measurement and the projection vector. In some embodiments, when the metric satisfies a source present threshold, the method indicates that presence of the source has been detected. When the metric satisfies a source present threshold, the method indicates that presence of the source has been semi-definitively detected.

One or more computing systems are provided for generating a metric relating to a source of radiation in measurements of radiation. The one or more computing systems comprise one or more computer-readable storage mediums for storing computer-executable instructions for controlling the one or more computing systems and one or more processors for executing the computer-executable instructions stored in the one or more computer-readable storage mediums. The instructions access a source signature of the source and an estimated background. The instructions generate a first hypothesis based on the estimated background and an estimated background rate. The instructions generate a second hypothesis based on the estimated background, the estimated background rate, and the source signature. The instructions generate a first likelihood for the first hypothesis given a Poisson distribution. The instructions generate a second likelihood for the second hypothesis given the Poisson distribution. The instructions generate a projection vector based on the first likelihood and the second likelihood. The instructions access a measurement. The instructions generate the metric based on the measurement, the projection vector, and the estimate background rate. In some embodiments, the source signature is a histogram representing an energy range divided into energy bins and each energy bin has a value representing a count of photons emitted by that source over a time interval. In some embodiments, a source signature represents a shielding of the source. In some embodiments, the instructions aggregate measurements of different numbers of measurements and for each aggregated measurement, generating a metric based on the aggregated measurement and the projection vector. In some embodiments, when the metric satisfies a source present threshold, the instructions indicates that presence of the source has been detected. In some embodiments, when the metric satisfies a source present threshold, the instructions indicate that presence of the source has been semi-definitively detected.

In some embodiments, a method performed by one or more computing systems is provided for generating a metric for indicating presence of a source of radiation in measurements of radiation collected in sequence. The method constructs hypotheses represented by the following equations:

$$H_0 = B_s B_r \Delta t$$

$$H_1 = B_s B_r \Delta t + S_s k \sqrt{B_r \Delta t}$$

where $H_0$ and $H_1$ are the hypotheses, $B_s$ represents a background shape, $S_s$ represents a source signature shape, $B_r$ represents a background rate estimate, $\Delta t$ represents change time period, and each shape is a histogram with a total count of 1. The method calculates a likelihood of each measurement given Poisson statistics as represented by the following equation:

$$P(X \mid H) = \frac{\Pi_i \exp(-h_i) h_i^{x_i}}{x_i!}$$

where $h_i$ represents the i-th element of the hypothesis. The method generates a ratio of the hypotheses as represent by the following equation:

$$LRT(X) = \log\left(1 + \frac{k}{\sqrt{B_r \Delta t}} \frac{S_s}{B_s}\right)^t X - \frac{k}{\sqrt{B_r \Delta t}} = T^t X + M.$$

The method generates the metric by as represented by the following equation:

$$DM = \frac{(T^t X + \kappa B_r \Delta t)}{\sqrt{v B_r \Delta t}}$$

where DM represents the metric and K represents a bias term for any difference in the estimated total count in the background and an expected background total count in the background. In some embodiments, the source signature is a histogram representing an energy range divided into energy bins, each energy bin having a value representing a count of photons emitted by that source over a time interval. In some embodiments, a source signature represents a shielding of the source. In some embodiments, the method further generates aggregated measurements of different numbers of measurements and for each aggregated measurement, generating a metric based on the aggregated measurement, the projection vector, and an expected variance for the aggregated measurement.

Rank Average

In some embodiments, a method performed by one or more computing systems is provided for adjusting measurement counts of measurements to account for temporary changes in the measurements. The method accesses measurements. For each measurement, the method generates a measurement count of that measurement. The method generates an upper average measurement count that is an average of the measurement counts higher than a threshold count. The measurement calculates an expected offset for a probabilistic distribution based on the upper average measurement count and the measurement counts higher than the threshold. For each measurement, the method subtracts the expected offset from the measurement count for that measurement. In some embodiments, the measurements are of radiation and the temporary changes are a result of changes in background radiation. In some embodiments, the method further detects when the measurements include a source of radiation. In some embodiments, the detecting is performed using a gross count detection algorithm. In some embodiments, the upper average measurement count is based on a probability distribution.

In some embodiments, one or more computing system for adjusting measurement counts of measurements to account for temporary changes in the measurements. The one or more computing system comprise one or more computer-readable storage mediums for storing computer-executable instructions for controlling the one or more computing systems and one or more processors for executing the computer-executable instructions stored in the one or more computer-readable storage mediums. For each measurement of a plurality of measurements, the instructions generate a measurement count of that measurement. The instructions generate an upper average measurement count that is an average of the measurement counts higher than a threshold count. The instructions calculate an expected offset for a probabilistic distribution based on the upper average measurement count and the measurement counts higher than the threshold. For each measurement, the instructions subtract the expected offset from the measurement count for that measurement. In some embodiments, 7 the measurements are of radiation and the temporary changes are a result of changes in background radiation. In some embodiments, the instructions further detect when the measurements include a source of radiation. In some embodiments, the detecting is performed using a gross count detection algorithm. In some embodiments, the upper average measurement count is based on a probability distribution.

Progressive Projection

In some embodiments, a method performed by one or more computing systems is provided for estimating a background histogram of background counts measurement histograms of measurement counts of measurements collected to detect presence of a source histogram of a source within the measurements. The method accesses spanning vectors of histograms that span a linear combination of prior background histograms derived from prior measurement histograms. The method calculates a current background histogram for the sequence of current measurement histograms. The method determines whether the current background histograms have a strong association with or a strong disassociation with a spanning vector. Upon determining that the current background histogram has a strong association with or a strong disassociation with a spanning vector, the method modifies that spanning vector based on the current background histogram. After modifying that spanning vector, the method adjusts the spanning vectors to increase diversity. In some embodiments, the adjusting attempts to maximize eigenvalues association with a correlation matrix formed by the spanning vectors. In some embodiments, the method applies a detection algorithm to detect presence of the source in a target measurement factoring the adjusted spanning vectors. In some embodiments, the source is a source of radiation. In some embodiments, the prior measurement histograms are predefined histograms. In some embodiments, the prior measurement histograms include histograms collected during a same collection process and prior to collection of the sequence of current measurement histogram. In some embodiments, the prior measurement histograms not collecting during the same collection process.

In some embodiments, one or more computing systems are provided for estimating a background histogram of background counts measurement histograms of measurement counts of measurements collected to detect presence of a source histogram of a source within the measurements. The one or more computing systems comprise one or more computer-readable storage mediums for storing computer-executable instructions for controlling the one or more computing systems and one or more processors for executing the computer-executable instructions stored in the one or more computer-readable storage mediums. The instructions access spanning vectors of histograms that span a linear combination of prior background histograms derived from prior measurement histograms. The instructions calculate a current background histogram for the sequence of current measurement histograms. The instructions determine whether the current background histograms have a strong association with or a strong disassociation with a spanning vector. Upon determining that the current background histogram has a strong association with or a strong disassociation with a spanning vector, the instructions modify that spanning vector based on the current background histogram. After modifying that spanning vector, the instructions adjust the spanning vectors to increase diversity. In some embodiments, the instructions that adjust attempt to maximize eigenvalues association with a correlation matrix formed by the spanning vectors. In some embodiments, the instructions further apply a detection algorithm to detect presence of the source in a target measurement factoring the adjusted spanning vectors. In some embodiments, the source is a source of radiation. In some embodiments, the prior measurement histograms are predefined histograms. In some embodiments, the prior measurement histograms include histograms collected during a same collection process and prior to collection of the sequence of current measurement histogram. In some embodiments, the prior measurement histograms not collecting during the same collection process.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. One or more computing systems for identifying a source of radiation, the one or more computing system comprising:
   one or more computer-readable storage mediums storing computer-executable instructions of:
   a radiation source detector that:
   receives measurements of radiation;
   for one or more sources, generates a detection metric indicating whether that source is present in the measurements; and
   evaluates the detection metrics to detect whether a source is present in the measurements; and a radiation source identifier that, when the presence of a source in the measurements is detected,
for one or more sources, generates an identification metric indicating whether that source is present in the measurements;
generates a null-hypothesis metric indicating whether no source is present in the measurements based on analysis of the measurements and the one or more identification metrics; and
evaluates the one or more identification metrics and the null-hypothesis metric to identify the source, if any, that is present in the measurements; and
one or more processor for executing the computer-executable instructions stored in the one or more computer-readable storage mediums.

2. The one or more computing systems of claim 1 wherein the radiation source detector generates the detection metric for a source based on a detection source signature for that source and the radiation identification detector generates the identification metric for a source based on a plurality of identification source signatures for that source.

3. The one or more computing systems of claim 2 wherein the identification sources signatures for a source represent that source with different shieldings.

4. The one or more computing systems of claim 1 wherein the radiation source identifier identifies a radiation source class for an identified source.

5. The one or more computing systems of claim 1 wherein the measurements are calibrated to account for drift in the detector that collected the measurements.

6. The one or more computing systems of claim 1 wherein the radiation source identifier generates an aggregated metric for each source.

7. The one or more computing systems of claim 1 wherein the measurements with in a window are aggregated and radiation is detected and identified based on aggregated measurements.

8. A method performed by a computing system for detecting presence of a source of radiation from a measurement of radiation, the method comprising:
for one or more of sources,
for one or more detection algorithms,
generating a metric using that detection algorithm, the metric indicating similarity between a current measurement and a source signature for that source, that detection algorithm factoring in an estimate of background radiation generated based on prior measurements to the current measurement; and
generating an aggregated metric for that source from one or more metrics for that source;
analyzing the aggregated metric for one or more sources to determine whether a source is likely present in the current measurement; and
upon determining that a source is likely present in the current measurement, indicating that the presence of a source has been detected.

9. The method of claim 8 further comprising generating an estimate of background radiation based on prior measurements excluding prior measurements for which the presence of a source was detected.

10. The method of claim 9 wherein the estimate of background radiation is a weighted average based on a measurement and a prior estimate of background radiation.

11. The method of claim 8 wherein a source signature is associated with an identification of a source and a shielding of the source.

12. The method of claim 11 wherein for each detection algorithm, a metric is generated for each source signature associated with a source.

13. The method of claim 8 wherein a measurement is represented by a histogram of energy ranges with a count of photons for each energy range.

14. The method of claim 8 wherein a metric is generated for each of a plurality of windows measurements, each window including the current measurement and a number of adjacent prior measurement.

15. The method of claim 8 wherein a detection algorithm is associated with coefficients and further comprising dynamically adjusting the coefficients based on an estimate of background radiation.

16. The method of claim 8 wherein the analyzing of the aggregated metrics includes applying a classifier that is trained using training data that includes feature vectors with features that include detection algorithm, a window size, and an aggregated metric and a label for each feature vector indicating whether a source is present.

17. The method of claim 16 wherein the feature vectors are generated from collected measurements of radiation.

18. The method of claim 16 wherein the feature vectors are generated from simulated measurements of radiation.

19. The method of claim 18 further comprising calibrating the current measurement to account for drift associated with a detector used to collect the measurements.

20. A method performed by a computing system for identifying a source of radiation from a measurement of radiation, the method comprising:
receiving a current measurement for which presence of a source has been detected based on detection source signatures;
for each of a plurality of identification source signatures, generating a metric using an identification algorithm, the metric indicating similarity between a current measurement and a source signature for that source, the identification algorithm factoring in an estimate of background radiation generated when detecting the presence of the source, the identification source signatures being more comprehensive than the detection source signatures;
for each source, generating a source metric based on one or more metrics generated using a source signature for that source, wherein at least one source metric is generated based on more than one metric;
generating a null-hypothesis metric indicating similarity between the current measurement and the estimate of background radiation, the sources and the estimate of background radiation being targets, the source metrics and the null-hypothesis metric being target metrics; and
for each target, generating a target probability representing presence of that target in the current measurement, the target probability based on the target metric for that target.

21. The method of claim 20 further comprising, for each of a plurality of radiation source classes, generating a radiation source class probability that the current measurement represents a source of that radiation source class, the radiation source class probabilities generated based on target probabilities.

22. The method of claim 20 wherein the generating of a target probability factors in prior probabilities for each target.

23. The method of claim 20 wherein the identification algorithm is based on an orthonormal subspace projection matched filter algorithm.

24. A method performed by a computing system for generating a metric relating to a source of radiation in measurements of radiation, the method comprising:
  accessing a source signature of the source, an estimated background, and background basis vectors;
  generating a projection vector based on the source signature, estimated background, and the background basis vectors, and
  accessing a measurement; and
  generating the metric based on the measurement, the projection vector, and an expected variance for the measurement.

25. The method of claim 24 wherein the source signature is a histogram representing an energy range divided into energy bins, each energy bin having a value representing a count of photons emitted by that source over a time interval.

26. The method of claim 25 wherein the generating of the projection vector includes generating a weighting matrix from the estimated background wherein a variance of each energy bin is based on the expected background.

27. The method of claim 25 wherein the generating of the projection vector further includes generating a source signature weighted projection and a background weighted projection and setting the projection vector to the difference between the source signature weighted projection and the background weighted projection.

28. The method of claim 24 wherein a source signature represents a shielding of the source.

29. The method of claim 24 further comprising generating aggregated measurements of different numbers of measurements and for each aggregated measurement, generating the metric further based on the aggregated measurement, the projection vector, and an expected variance for the aggregated measurement.

30. The method of claim 24 further comprising when the metric satisfies a source present threshold, indicating that presence of the source has been detected.

31. The method of claim 24 further comprising when the metric satisfies a source present threshold, indicating that presence of the source has been semi-definitively detected.

32. The method of the claim 24 wherein the generating of the metric includes dividing the product of the projection vector and the measurement by the square root of the expected variance.

33. One or more computing system for generating a metric relating to a source of radiation in measurements of radiation, the one or more computing systems comprising:
  one or more computer-readable storage mediums storing computer-executable instructions for controlling the one or more computing systems to:
    access a source signature of the source, an estimated background, and background basis vectors;
    generate a projection vector based on the source signature, estimated background, and the background basis vectors, and
    access a measurement; and
    generate the metric based on the measurement, the projection vector, and an expected variance for the measurement;
  one or more processors for executing the computer-executable instructions stored in the one or more computer-readable storage mediums.

34. The one or more computing systems of claim 33 wherein the source signature is a histogram representing an energy range divided into energy bins, each energy bin having a value representing a count of photons emitted by that source over a time interval.

35. The one or more computing systems of claim 34 wherein the instructions that generate of the projection vector generate a weighting matrix from the estimated background wherein a variance of each energy bin is based on the expected background.

36. The one or more computing systems of claim 35 wherein the instructions that generate the projection vector further generate source signature weighted projection and a background weighted projection and sets the projection vector to the difference between the source signature weighted projection and the background weighted projection.

37. The one or more computing systems of claim 33 wherein a source signature represents a shielding of the source.

38. The one or more computing systems of claim 33 wherein the instructions further generate aggregated measurements of different numbers of measurements and for each aggregated measurement, generate a metric based on the aggregated measurement, the projection vector, and an expected variance for the aggregated measurement.

39. The one or more the computing systems of claim 33 wherein the instructions further, when the metric satisfies a source present threshold, indicate that presence of the source has been detected.

40. The one or more the computing systems of claim 33 wherein the instructions further, when the metric satisfies a source present threshold, indicate that presence of the source has been semi-definitively detected.

41. The one or more the computing systems of claim 33 wherein the instructions that generates of the detection metric divides the product of the projection vector and the measurement by the square root of an expected variance.

42. A method performed by a computing system for generating a metric relating to a source of radiation in measurements of radiation collected in sequence, the method comprising:
  accessing a source signature of the source, an estimated background, and background basis vectors;
  generating a projection vector as represented by the following equation:

$$T = S^t W(I - B(B^t W B)^{-1} B^t W)$$

where T represents the projection vector, S represents the source signature, B represents the estimated background, and W represents the background basis vectors; and
  accessing a measurement; and
  generating the metric by as represented by the following equation:

$$DM = \frac{TX}{\sqrt{|X|_1}}$$

where DM represents the metric, X represents the measurement and $|X|_1$ represents the expected variance for the measurement.

43. The method of claim 42 further comprising detecting presence of a source of based on the metric.

44. The method of claim 42 further comprising identifying the source based on the metric.

45. The method of claim 42 wherein the source signature is a histogram representing an energy range divided into energy bins, each energy bin having a value representing a count of photons emitted by that source over a time interval.

46. The method of claim 42 wherein a source signature represents a shielding of the source.

47. The method of claim 42 further comprising generating aggregated measurements of different numbers of measurements and for each aggregated measurement, generating a metric based on the aggregated measurement, the projection vector, and an expected variance for the aggregated measurement.

\* \* \* \* \*